US00RE43312E

(19) United States
(12) Reissued Patent
Nakatani et al.

(10) Patent Number: US RE43,312 E
(45) Date of Reissued Patent: Apr. 17, 2012

(54) REFRIGERATION CYCLE APPARATUS

(75) Inventors: Kazuo Nakatani, Osaka (JP); Yoshikazu Kawabe, Shiga (JP); Yuji Inoue, Shiga (JP); Noriho Okaza, Shiga (JP); Akira Hiwata, Kyoto (JP)

(73) Assignee: Panasonic Corporation, Kadoma-shi (JP)

(21) Appl. No.: 11/785,569

(22) Filed: Apr. 18, 2007

Related U.S. Patent Documents

Reissue of:
(64) Patent No.: 6,880,357
Issued: Apr. 19, 2005
Appl. No.: 10/657,180
Filed: Sep. 9, 2003

(30) Foreign Application Priority Data

Oct. 31, 2002 (JP) ..... 2002-318129

(51) Int. Cl.

| | |
|---|---|
| ***F25B 13/00*** | (2006.01) |
| ***F25B 19/02*** | (2006.01) |
| ***F25B 27/00*** | (2006.01) |
| ***F25B 29/00*** | (2006.01) |
| ***F25B 1/10*** | (2006.01) |
| ***F28B 9/00*** | (2006.01) |
| ***F25D 9/00*** | (2006.01) |

(52) U.S. Cl. ..... 62/324.6; 62/324.1; 62/324.2; 62/324.3; 62/324.4; 62/324.5; 62/160; 62/170; 62/172; 62/238.7; 62/325; 62/326; 62/401; 62/402; 62/510

(58) Field of Classification Search ..... 62/324.6, 62/170, 510, 401, 402, 172, 324.1–326, 238.7, 62/160, 326.6
See application file for complete search history.

(56) References Cited

U.S. PATENT DOCUMENTS

| | | | | |
|---|---|---|---|---|
| 2,499,404 | A * | 3/1950 | Marsh | 62/54.2 |
| 2,515,825 | A * | 7/1950 | Grant | 62/95 |
| 3,144,316 | A * | 8/1964 | Stengel et al. | 62/616 |
| 4,063,417 | A * | 12/1977 | Shields | 60/641.5 |
| 4,321,801 | A * | 3/1982 | Collard, Jr. | 62/238.4 |
| 4,326,388 | A * | 4/1982 | McFee | 62/324.6 |
| 4,595,344 | A * | 6/1986 | Briley | 417/185 |
| 5,131,235 | A * | 7/1992 | Watanabe | 62/172 |
| 5,181,376 | A * | 1/1993 | Rao | 60/775 |
| 5,327,745 | A * | 7/1994 | Gilmour | 62/467 |

(Continued)

FOREIGN PATENT DOCUMENTS

CH 386-459 * 1/1965

(Continued)

OTHER PUBLICATIONS

Translation of JP 2002-22295 A to Hirata et al.*

(Continued)

*Primary Examiner* — Mohammad M Ali
(74) *Attorney, Agent, or Firm* — Kratz, Quintos & Hanson, LLP

(57) ABSTRACT

It is an object of the present invention to reduce the constraint that the density ratio is constant as small as possible, and to obtain high power recovering effect in a wide operation range. A refrigeration cycle apparatus uses carbon dioxide as refrigerant and has a compressor, an [outdoor heat exchanger] *evaporator*, an expander and [an indoor heat exchanger] *a radiator*. An injection circuit for introducing high pressure refrigerant is provided in a halfway of an expansion process of said expander.

9 Claims, 7 Drawing Sheets

U.S. PATENT DOCUMENTS

| | | | | | |
|---|---|---|---|---|---|
| 6,138,457 | A | * | 10/2000 | Lackstrom et al. | 60/651 |
| 6,301,922 | B1 | * | 10/2001 | Ochi | 62/402 |
| 6,312,843 | B1 | * | 11/2001 | Kimbara et al. | 429/25 |
| 6,321,564 | B1 | * | 11/2001 | Yamanaka et al. | 62/510 |
| 6,343,482 | B1 | * | 2/2002 | Endo et al. | 62/324.6 |
| 6,381,973 | B1 | * | 5/2002 | Bhatti et al. | 62/172 |
| 6,477,857 | B2 | * | 11/2002 | Takeuchi et al. | 62/500 |
| 6,550,265 | B2 | * | 4/2003 | Takeuchi et al. | 62/324.2 |
| 6,606,873 | B2 | * | 8/2003 | Takeuchi | 62/191 |
| 6,612,117 | B2 | * | 9/2003 | Kasmer | 62/6 |
| 6,729,149 | B2 | * | 5/2004 | Takeuchi | 62/191 |

FOREIGN PATENT DOCUMENTS

| | | | | |
|---|---|---|---|---|
| EP | 0635673 | A1 | * | 1/1995 |
| JP | 63-231138 | | * | 9/1988 |
| JP | 2000-234814 | | * | 8/2000 |
| JP | 2001-116371 | | * | 4/2001 |
| JP | 2002-22295 | A | * | 1/2002 |

OTHER PUBLICATIONS

Abstract of JP 2002-22295 A to Hirata et al.*

Joo Seok Baek, et al. “transcritical CO2 Cycle Technology” 2002 SAE Automotive Alternate Refrigerant Systems Symposium, Jul. 2002, pp. 1-17.*

* cited by examiner

REFRIGERATION CYCLE APPARATUS

Matter enclosed in heavy brackets [ ] appears in the original patent but forms no part of this reissue specification; matter printed in italics indicates the additions made by reissue.

TECHNICAL FIELD

The present invention relates to a refrigeration cycle apparatus using carbon dioxide as refrigerant and having a compressor, an outdoor heat exchanger, an expander and an indoor heat exchanger.

BACKGROUND TECHNIQUE

A flow rate of refrigerant which circulates through a refrigeration cycle apparatus is all the same in any points in a refrigeration cycle. If a suction density of refrigerant passing through a compressor is defined as DC and a suction density of refrigerant passing through an expander is defined as DE, the DE/DC (density ratio) is always constant.

In recent years, attention is focused on a refrigeration cycle apparatus using, as refrigerant, carbon dioxide ($CO_2$, hereinafter) in which ozone destroy coefficient is zero and global warming coefficient is extremely smaller than Freon. The $CO_2$ refrigerant has a low critical temperature as low as 31.06° C. When a temperature higher than this temperature is utilized, a high pressure side (outlet of the compressor—gas cooler—inlet of pressure reducing device) of the refrigeration cycle apparatus is brought into a supercritical state in which $CO_2$ refrigerant is not condensed, and there is a feature that operation efficiency of the refrigeration cycle apparatus is deteriorated as compared with a conventional refrigerant. Therefore, it is important for the refrigeration cycle apparatus using $CO_2$ refrigerant to maintain optimal COP, and if an operating condition is changed, it is necessary to obtain an operating state (pressure and temperature of the refrigerant) which is optimal to this operating condition.

However, when the refrigeration cycle apparatus is provided with the expander and power recover by the expander is used as a portion of a driving force of the compressor, the number of rotation of the expander and the number of rotation of the compressor must be the same, and in the expander which is designed optimally with a predetermined density ratio, it is difficult to maintain the optimal COP when the operation condition is changed.

Hence, there is proposed a structure in which a bypass pipe which bypasses the expander is provided, the refrigerant amount flowing into the expander is controlled, and the optimal COP is maintained (see patent documents 1 and 2 for example)

[Patent Document 1]

Japanese Patent Application Laid-open No. 2000-234814 (paragraphs (0024) and (0025) and FIG. 1)

[Patent Document 2]

Japanese Patent Application Laid-open No. 2001-116371 (paragraph (0023) and FIG. 1)

However, there is a problem that as a difference between an amount of refrigerant which flows into the expander and an optimal flow rate in terms of design is increased, an amount of refrigerant flowing through the bypass pipe is increased and as a result, power which could have been recovered can not sufficiently recover.

If the power recover by the expander is used as a driving force for an auxiliary compressor which is different from the compressor, it is possible to eliminate the constraint that the number of rotation of the expander and the number of rotation of the compressor must be the same. However, even if the auxiliary compressor is driven by the expander, the constraint that the density ratio is constant is still remained, and it is still necessary to control the amount of refrigerant which flows into the expander.

Thereupon, it is an object of the present invention to reduce the constraint that the density ratio is constant as small as possible, and to obtain high power recovering effect in a wide operation range.

It is another object of the invention to introduce high pressure refrigerant in a halfway of the expansion process to increase the flow rate of refrigerant per one expansion process, thereby recovering power efficiently.

SUMMARY OF THE INVENTION

A first aspect of the present invention provides a refrigeration cycle apparatus using carbon dioxide as refrigerant and having a compressor, an [outdoor heat exchanger] *evaporator*, an expander and [an indoor heat exchanger] *a radiator*, wherein an injection circuit for introducing high pressure refrigerant is provided in a halfway of an expansion process of said expander.

According to this aspect, when it is necessary to increase the flow rate of refrigerant without changing the number of rotation of the expander, it is possible to increase the flow rate of refrigerant per one expansion process by introducing refrigerant from the injection circuit, and it is possible to recover power efficiently.

According to a second aspect of the invention, in the first aspect, the apparatus further comprises an adjusting valve for adjusting an amount of refrigerant from the injection circuit. By controlling the amount of refrigerant from the injection circuit, it is possible to optimally adjust the amount of refrigerant per one expansion process, and to recover power efficiently.

According to a third aspect of the invention, in the first aspect, the expander is provided at its refrigerant-inflow side with a pre-expansion valve. When it is necessary to reduce the amount of refrigerant without changing the number of rotation of the expander, it is possible to reduce the flow rate of refrigerant per one expansion process by reducing the opening of the pre-expansion valve.

According to a fourth aspect of the invention, in the first aspect, the expander is provided at its refrigerant-inflow side with a sub-expander. By pre-expansion is carried out by the sub-expander, it is possible to adjust a state of refrigerant in the inlet of the expander, and to optimally adjust the amount of refrigerant flowing through the expander. Therefore, it is possible to efficiently recover power in the expander, and to recover the expansion power also in the sub-expander which carries out the pre-expansion.

According to a fifth aspect of the invention, in the first aspect, the expander is provided at its refrigerant-outflow side with a sub-expander. It is possible to additionally expand by the sub-expander, and to optimally control the pressure in the outlet of the expander. Therefore, it is possible to efficiently recover power in the expander, and to recover the expansion power also in the sub-expander which carries out the additional expansion.

According to a sixth aspect of the invention, in the forth or fifth aspect, an electric generator is connected to the sub-expander.

By changing torque of the electric generator of the sub-expander, it is possible to change the amount of refrigerant flowing through the sub-expander, and to adjust the amount of refrigerant flowing through the expander such that the optimal COP can be obtained.

According to a seventh aspect of the invention in any of the first to fifth aspects, power recover by the expander can be used for driving the compressor.

According to an eighth aspect of the invention, in any of the first to fifth aspects, the compressor is provided at its suction side or discharge side with an auxiliary compressor, and power recover by the expander can be used as power for driving the auxiliary compressor.

According to a ninth aspect of the invention, in any of the first to fifth aspects, the apparatus further comprises a first four-way valve to which a discharge side pipe and a suction side pipe of the compressor are connected, and a second four-way valve to which a discharge side pipe and a suction side pipe of the expander are connected, and refrigerant discharged from the compressor is selectively allowed to flow into the indoor heat exchanger or the outdoor heat exchanger by the first four-way valve, a direction of refrigerant flowing through the expander is always set in the same direction by the second four-way valve. According to this aspect, the first to fifth aspects can be utilized as a cooling and heating air conditioner.

According to a tenth aspect of the invention, in the eighth aspect, the apparatus further comprises a first four-way valve to which discharge side pipes and suction side pipes of the compressor and the auxiliary compressor are connected, and a second four-way valve to which a discharge side pipe and a suction side pipe of the expander are connected, and refrigerant discharged from the compressor and the auxiliary compressor is selectively allowed to flow into the indoor heat exchanger or the outdoor heat exchanger by the first four-way valve, a direction of refrigerant flowing through the expander and the sub-expander is always set in the same direction by the second four-way valve. Therefore, the eighth aspect can be utilized as a cooling and heating air conditioner.

PREFERRED EMBODIMENTS

A refrigeration cycle apparatus according to an embodiment of the present invention will be explained with reference to the drawings below.

Figure 1:
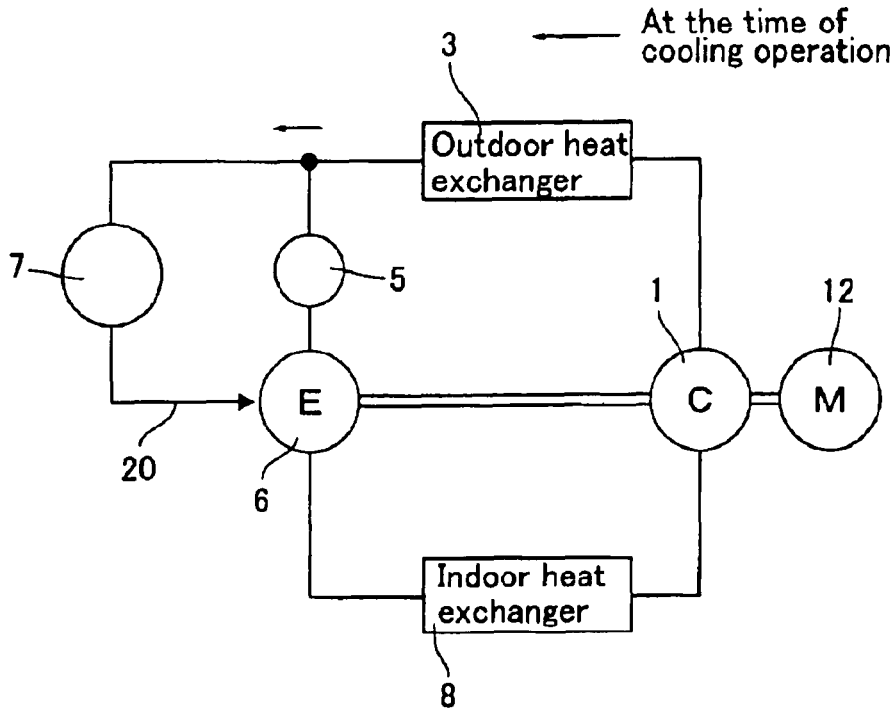
FIG. 1 shows a structure of a heat pump type cooling and heating air conditioner according to an embodiment of the present invention.

FIG. 1 shows a structure of the heat pump type air conditioner of the present embodiment.

As shown in FIG. 1, the heat pump type air conditioner of this embodiment uses $CO_2$ refrigerant as refrigerant, and has refrigerant circuit. The refrigerant circuit comprises a compressor 1 having a motor 12, an outdoor heat exchanger 3, an expander 6 and an indoor heat exchanger 8 which are all connected to one another through pipes.

The expander 6 is provided at its inflow side with a pre-expansion valve 5.

The refrigerant circuit is provided with an injection circuit 20. The injection circuit 20 introduces high pressure refrigerant on the side of an outlet of the outdoor heat exchanger 3 in a halfway of the expansion process of the expander 6. The injection circuit 20 is provided with an adjusting valve 7 which adjusts an amount of refrigerant flowing through the injection circuit 20.

A drive shaft of the expander 6 and a drive shaft of the compressor 1 are connected to each other, and the compressor 1 utilizes power recover by the expander 6 for driving.

The operation of the heat pump type air conditioner of this embodiment will be explained below.

Refrigerant is compressed at a high temperature and under a high pressure by the compressor 1 which is driven by the motor 12. The refrigerant is discharged and introduced into the outdoor heat exchanger 3. In the outdoor heat exchanger 3, since $CO_2$ refrigerant is in a supercritical state, the refrigerant is not brought into two-phase state, and dissipates heat to outside fluid such as air and water. Then, the $CO_2$ refrigerant is introduced into the pre-expansion valve 5 and the expander 6, and is expanded by the pre-expansion valve 5 and the expander 6. Power recover by the expander 6 at the time of expansion is used for driving the compressor 1. At that time, an optimal amount of refrigerant flowing into the expander 6 is calculated from a high pressure refrigerant temperature, a high pressure refrigerant pressure and a refrigerant evaporation pressure detected on the side of the outlet of the outdoor heat exchanger 3, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. If the flow rate of refrigerant is greater than the calculated optimal refrigerant amount, the opening of the pre-expansion valve 5 is reduced to reduce the flow rate of refrigerant flowing into an inlet of the expander 6.

The $CO_2$ refrigerant expanded by the pre-expansion valve 5 and the expander 6 is evaporated and suctions heat in the indoor heat exchanger 8. A room is cooled by this endotherm. The refrigerant which has been evaporated is drawn into the compressor 1.

According to this embodiment, it is possible to adjust the flow rate of refrigerant in one expansion process by controlling the amount of refrigerant from the injection circuit 20. If the flow rate of refrigerant flowing into the expander 6 is greater than a designed flow rate, the opening of the pre-expansion valve 5 is reduced to reduce the density and it is possible to reduce the flow rate of refrigerant flowing into the expander 6. Therefore, it is possible to efficiently recover power in the expander 6 and to more efficiently recover power from the refrigeration cycle.

A refrigeration cycle apparatus according to another embodiment of the present invention will be explained with reference to the drawing based on a heat pump type cooling and heating air conditioner.

Figure 2:
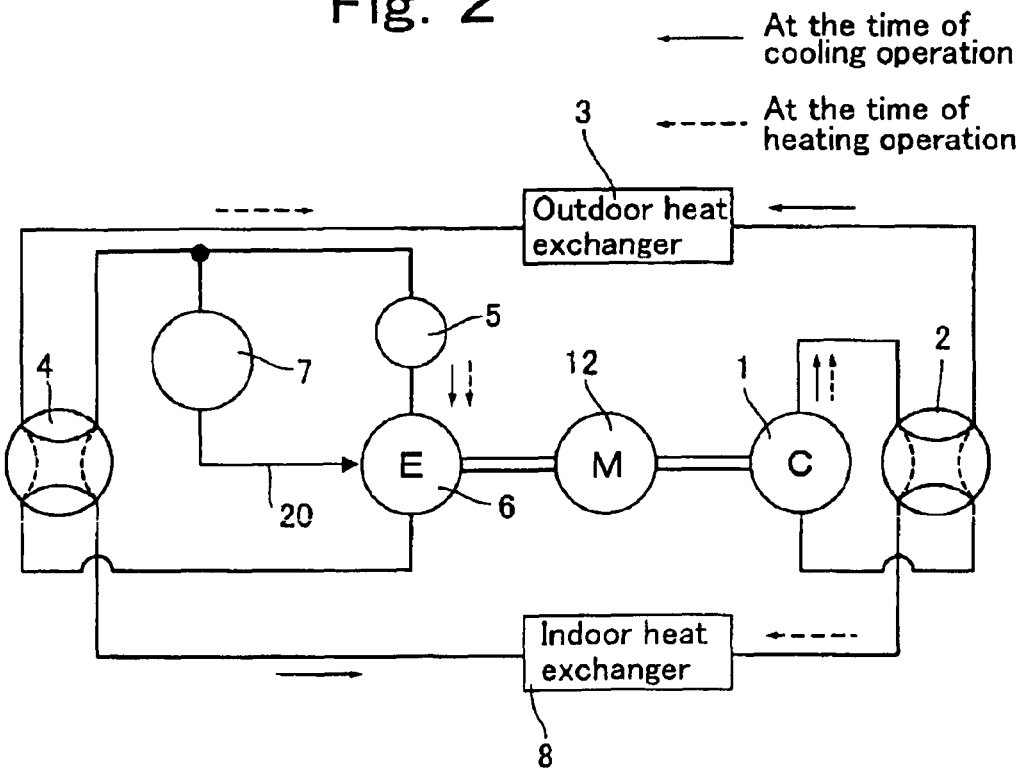
FIG. 2 shows a structure of a heat pump type cooling and heating air conditioner according to another embodiment of the invention.

FIG. 2 shows a structure of the heat pump type cooling and heating air conditioner of this embodiment.

As shown in FIG. 2, the heat pump type cooling and heating air conditioner of this embodiment uses a $CO_2$ refrigerant as refrigerant, and comprises a refrigerant circuit in which a compressor 1 having a motor 12, an outdoor heat exchanger 3, an expander 6 and an indoor heat exchanger 8 are connected to one another through pipes.

The expander 6 is provided at its inflow side with a pre-expansion valve 5.

The refrigerant circuit is provided with an injection circuit 20 which introduces high pressure refrigerant on the side of the outlet of the outdoor heat exchanger 3 in a halfway of the expansion process of the expander 6. The injection circuit 20 is provided with an adjusting valve 7 which adjusts an amount of refrigerant flowing through the injection circuit 20.

A drive shaft of the expander 6 and a drive shaft of the compressor 1 are connected to each other, and the compressor 1 utilizes power recover by the expander 6 for driving.

The refrigerant circuit includes a first four-way valve 2 to which a discharge side pipe and a suction side pipe of the compressor 1 are connected, and a second four-way valve 4 to which a suction side pipe of the pre-expansion valve 5, a discharge side pipe of the expander 6 and the injection circuit 20 are connected.

The operation of the heat pump type cooling and heating air conditioner of this embodiment will be explained.

First, a cooling operation mode in which the outdoor heat exchanger 3 is used as a gas cooler and the indoor heat exchanger 8 is used as an evaporator will be explained. A flow of the refrigerant in the cooling operation mode is shown with solid arrows in the drawing.

Refrigerant at the time of the cooling operation mode is compressed at a high temperature and under a high pressure by the compressor 1 which is driven by the motor 12 and is discharged. The refrigerant is introduced into the outdoor heat exchanger 3 through the first four-way valve 2. In the outdoor heat exchanger 3, since $CO_2$ refrigerant is in a supercritical state, the refrigerant is not brought into two-phase state, and dissipates heat to outside fluid such as air and water. Then, the $CO_2$ refrigerant is introduced into the pre-expansion valve 5 and the expander 6 and is expanded by the pre-expansion valve 5 and the expander 6. Power recover by the expander 6 at the time of expanding operation is used for driving the compressor 1. At that time, an optimal amount of refrigerant flowing into the expander 6 is calculated from a high pressure refrigerant temperature, a high pressure refrigerant pressure and a refrigerant evaporation pressure detected on the side of the outlet of the outdoor heat exchanger 3, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. If the flow rate of refrigerant is greater than the calculated optimal refrigerant amount, the opening of the pre-expansion valve 5 is reduced to reduce the flow rate of refrigerant flowing into an inlet of the expander 6.

The $CO_2$ refrigerant expanded by the pre-expansion valve 5 and the expander 6 is introduced into the indoor heat exchanger 8 through the second four-way valve 4 and is evaporated and suctions heat in the indoor heat exchanger 8. A room is cooled by this endotherm. The refrigerant which has been evaporated is drawn into the compressor 1.

Next, a heating operation mode in which the outdoor heat exchanger 3 is used as the evaporator and the indoor heat exchanger 8 is used as the gas cooler will be explained. A flow of a refrigerant in this heating operation mode is shown with dashed arrows in the drawing.

Refrigerant at the time of the heating operation mode is compressed at a high temperature and under a high pressure by the compressor 1 which is driven by the motor 12 and is discharged. The refrigerant is introduced into the indoor heat exchanger 8 through the first four-way valve 2. In the indoor heat exchanger 8, since $CO_2$ refrigerant is in a supercritical state, the refrigerant is not brought into two-phase state, and dissipates heat to outside fluid such as air and water. A room is heated utilizing this radiation. Then, the $CO_2$ refrigerant is introduced into the pre-expansion valve 5 and the expander 6, and is expanded by the pre-expansion valve 5 and the expander 6. Power recover by the expander 6 at the time of expanding operation is used for driving the compressor 1. At that time, an optimal amount of refrigerant flowing into the expander 6 is calculated from a high pressure refrigerant temperature, a high pressure refrigerant pressure and a refrigerant evaporation pressure detected on the side of the outlet of the indoor heat exchanger 8, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. If the flow rate of refrigerant is greater than the calculated optimal refrigerant amount, the opening of the pre-expansion valve 5 is reduced to reduce the flow rate of refrigerant flowing into an inlet of the expander 6.

The $CO_2$ refrigerant expanded by the pre-expansion valve 5 and the expander 6 is introduced into the outdoor heat exchanger 3 through the second four-way valve 4 and is evaporated and suctions heat in the outdoor heat exchanger 3. The refrigerant which has been evaporated is drawn into the compressor 1 through the first four-way valve 2.

As described above, according to this embodiment, like the above embodiment, power can efficiently be recovered in the expander 6, and more power can be recovered from the refrigeration cycle, and since the apparatus includes the first four-way valve 2 and the second four-way valve 4, the apparatus can be utilized as a cooling and heating air conditioner.

A refrigeration cycle apparatus according to another embodiment of the present invention will be explained with reference to the drawing based on a heat pump type cooling and heating air conditioner.

Figure 3:
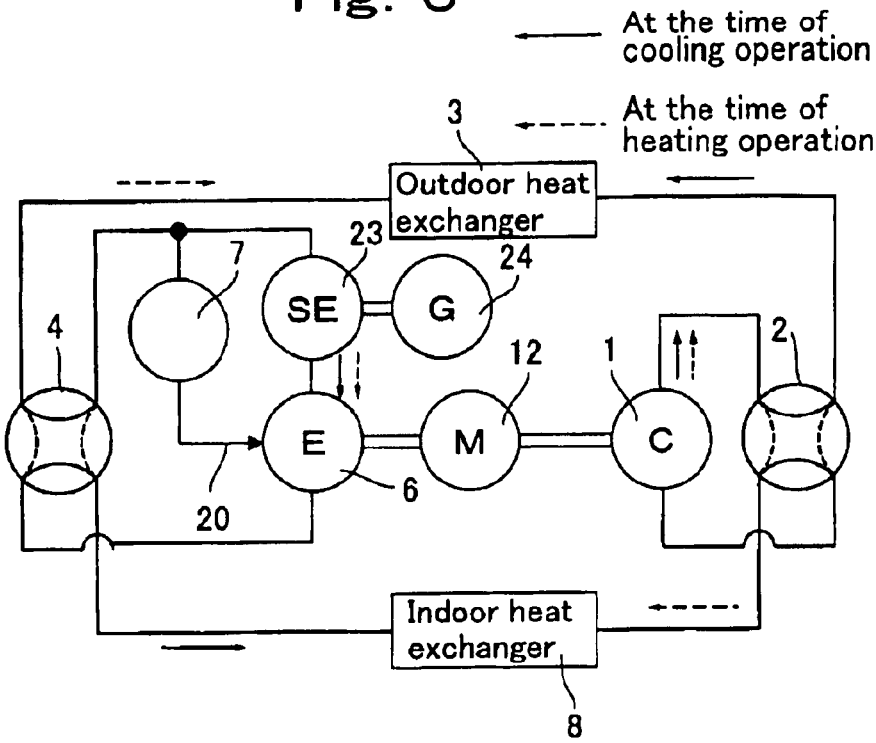
FIG. 3 shows a structure of a heat pump type cooling and heating air conditioner according to another embodiment of the invention.

FIG. 3 shows a structure of the heat pump type cooling and heating air conditioner of this embodiment.

As shown in FIG. 3, the heat pump type cooling and heating air conditioner of this embodiment uses a $CO_2$ refrigerant as refrigerant, and comprises a refrigerant circuit in which a compressor 1 having a motor 12, an outdoor heat exchanger 3, an expander 6 and an indoor heat exchanger 8 are connected to one another through pipes.

The expander 6 is provided at its inflow side with a sub-expander 23, and an electric generator 24 is connected to a drive shaft of the sub-expander 23.

The refrigerant circuit is provided with an injection circuit 20 which introduces high pressure refrigerant on the side of the outlet of the outdoor heat exchanger 3 in a halfway of the expansion process of the expander 6. The injection circuit 20 is provided with an adjusting valve 7 which adjusts an amount of refrigerant flowing through the injection circuit 20.

A drive shaft of the expander 6 and a drive shaft of the compressor 1 are connected to each other, and the compressor 1 utilizes power recover by the expander 6 for driving.

The refrigerant circuit includes a first four-way valve 2 to which a discharge side pipe and a suction side pipe of the compressor 1 are connected, and a second four-way valve 4 to which a suction side pipe of the sub-expander 23 and a discharge side pipe of the expander 6 are connected.

The operation of the heat pump type cooling and heating air conditioner of this embodiment will be explained.

First, a cooling operation mode in which the outdoor heat exchanger 3 is used as a gas cooler and the indoor heat exchanger 8 is used as an evaporator will be explained. A flow of the refrigerant in the cooling operation mode is shown with solid arrows in the drawing.

Refrigerant at the time of the cooling operation mode is compressed at a high temperature and under a high pressure by the compressor 1 which is driven by the motor 12 and is discharged. The refrigerant is introduced into the outdoor heat exchanger 3 through the first four-way valve 2. In the outdoor heat exchanger 3, since $CO_2$ refrigerant is in a supercritical state, the refrigerant is not brought into two-phase state, and dissipates heat to outside fluid such as air and water. Then, the $CO_2$ refrigerant is introduced into the sub-expander 23 and the expander 6 and is expanded by the sub-expander 23 and the expander 6. Power recover by the expander 6 at the time of expanding operation is used for driving the compressor 1. At that time, an optimal amount of refrigerant flowing into the expander 6 is calculated from a high pressure refrigerant temperature, a high pressure refrigerant pressure and a refrigerant evaporation pressure 3, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. If the flow rate of refrigerant is greater than the calculated optimal refrigerant amount, torque of the electric generator 24 (load of the electric generator) is increased to reduce the flow rate of refrigerant flowing into an inlet of the expander 6.

The $CO_2$ refrigerant expanded by the sub-expansion device 23 and the expander 6 is introduced into the indoor heat exchanger 8 through the second four-way valve 4 and is evaporated and suctions heat in the indoor heat exchanger 8. A room is cooled by this endotherm. The refrigerant which has been evaporated is drawn into the compressor 1.

Next, a heating operation mode in which the outdoor heat exchanger 3 is used as the evaporator and the indoor heat exchanger 8 is used as the gas cooler will be explained. A flow of a refrigerant in this heating operation mode is shown with dashed arrows in the drawing.

Refrigerant at the time of the heating operation mode is compressed at a high temperature and under a high pressure by the compressor 1 which is driven by the motor 12 and is discharged. The refrigerant is introduced into the indoor heat exchanger 8 through the first four-way valve 2. In the indoor heat exchanger 8, since $CO_2$ refrigerant is in a supercritical state, the refrigerant is not brought into two-phase state, and dissipates heat to outside fluid such as air and water. A room is heated utilizing this radiation. Then, the $CO_2$ refrigerant is introduced into the sub-expander 23 and the expander 6, and is expanded by the sub-expander 23 and the expander 6. Power recover by the expander 6 at the time of expanding operation is used for driving the compressor 1. At that time, an optimal amount of refrigerant flowing into the expander 6 is calculated from a high pressure refrigerant temperature, a high pressure refrigerant pressure and a refrigerant evaporation pressure detected on the side of the outlet of the indoor heat exchanger, 8, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. If the flow rate of refrigerant is greater than the calculated optimal refrigerant amount, torque of the electric generator 24 (load of the electric generator) is increased to reduce the flow rate of refrigerant flowing into an inlet of the expander 6.

The $CO_2$ refrigerant expanded by the sub-expander 23 and the expander 6 is introduced into the outdoor heat exchanger 3 through the second four-way valve 4 and is evaporated and suctions heat in the outdoor heat exchanger 3. The refrigerant which has been evaporated is drawn into the compressor 1 through the first four-way valve 2.

As described above, according to this embodiment, it is possible to adjust the flow rate of refrigerant of the outlet of the expander 6 by controlling the amount of refrigerant from the injection circuit 20, and it is possible to control the amount of refrigerant flowing into the expander 6 by changing the torque of the electric generator 24 (i.e., load of the electric generator) connected to the sub-expander 23 to adjust a pressure in the inlet of the expander 6. Therefore, power can efficiently be recover in the expander 6, and more power can be recovered from the refrigeration cycle by utilizing the power recover from the sub-expander 23 for generating electricity in the electric generator 24.

A refrigeration cycle apparatus according to another embodiment of the present invention will be explained with reference to the drawing based on a heat pump type cooling and heating air conditioner.

Figure 4:
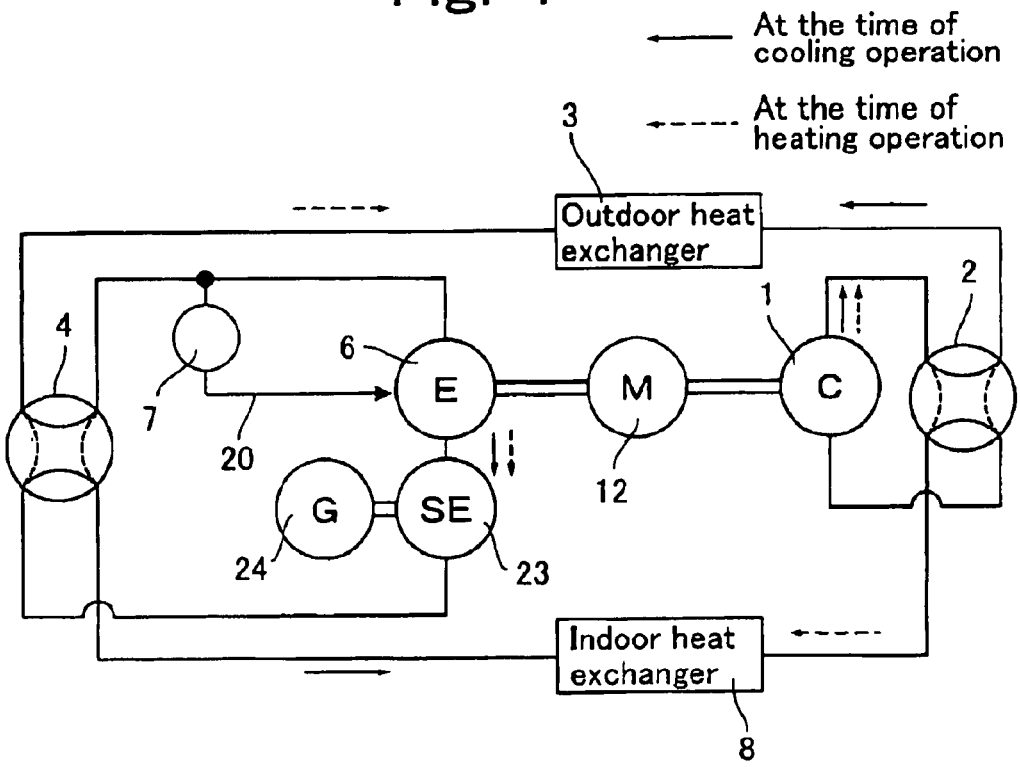
FIG. 4 shows a structure of a heat pump type cooling and heating air conditioner according to another embodiment of the invention.

FIG. 4 shows a structure of the heat pump type cooling and heating air conditioner of this embodiment.

As shown in FIG. 4, the heat pump type cooling and heating air conditioner of this embodiment uses a $CO_2$ refrigerant as refrigerant, and comprises a refrigerant circuit in which a compressor 1 having a motor 12, an outdoor heat exchanger 3, an expander 6 and an indoor heat exchanger 8 are connected to one another through pipes.

The expander 6 is provided at its discharge side with a sub-expander 23, and an electric generator 24 is connected to a drive shaft of the sub-expander 23.

The refrigerant circuit is provided with an injection circuit 20 which introduces high pressure refrigerant on the side of the outlet of the outdoor heat exchanger 3 in a halfway of the expansion process of the expander 6. The injection circuit 20 is provided with an adjusting valve 7 which adjusts an amount of refrigerant flowing through the injection circuit 20.

A drive shaft of the expander 6 and a drive shaft of the compressor 1 are connected to each other, and the compressor 1 utilizes power recover by the expander 6 for driving.

The refrigerant circuit includes a first four-way valve 2 to which a discharge side pipe and a suction side pipe of the compressor 1 are connected, and a second four-way valve 4 to which a discharge side pipe of the sub-expander 23, an inflow side pipe of the expander 6 and the injection circuit 20 are connected.

The operation of the heat pump type cooling and heating air conditioner of this embodiment will be explained First, a cooling operation mode in which the outdoor heat exchanger 3 is used as a gas cooler and the indoor heat exchanger 8 is used as an evaporator will be explained. A flow of the refrigerant in the cooling operation mode is shown with solid arrows in the drawing.

Refrigerant at the time of the cooling operation mode is compressed at a high temperature and under a high pressure by the compressor 1 which is driven by the motor 12 and is discharged. The refrigerant is introduced into the outdoor heat exchanger 3 through the first four-way valve 2. In the outdoor heat exchanger 3, since $CO_2$ refrigerant is in a supercritical state, the refrigerant is not brought into two-phase state, and dissipates heat to outside fluid such as air and water. Then, the $CO_2$ refrigerant is introduced into the expander 6 and the sub-expander 23 and is expanded by the expander 6 and the sub-expander 23. Power recover by the expander 6 at the time of expanding operation is used for driving the compressor 1. At that time, an optimal amount of refrigerant flowing into the expander 6 is calculated from a high pressure refrigerant temperature, a high pressure refrigerant pressure and a refrigerant evaporation pressure detected on the side of the outlet of the outdoor heat exchanger 3, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. In this case, torque of the electric generator 24 (load of the electric generator) is minimized. If the flow rate of refrigerant is greater than the calculated optimal refrigerant amount, the adjusting valve 7 is closed, and torque of the electric generator 24 (load of the electric generator) is increased to reduce the flow rate of refrigerant flowing into an inlet of the expander 6.

The $CO_2$ refrigerant expanded by the sub-expander 23 and the expander 6 is introduced into the indoor heat exchanger 8 through the second four-way valve 4 and is evaporated and suctions heat in the indoor heat exchanger 8. A room is cooled by this endotherm. The refrigerant which has been evaporated is drawn into the compressor 1.

Next, a heating operation mode in which the outdoor heat exchanger 3 is used as the evaporator and the indoor heat exchanger 8 is used as the gas cooler will be explained. A flow of a refrigerant in this heating operation mode is shown with dashed arrows in the drawing.

Refrigerant at the time of the heating operation mode is compressed at a high temperature and under a high pressure by the compressor 1 which is driven by the motor 12 and is discharged. The refrigerant is introduced into the indoor heat exchanger 8 through the first four-way valve 2. In the indoor heat exchanger 8, since $CO_2$ refrigerant is in a supercritical state, the refrigerant is not brought into two-phase state, and dissipates heat to outside fluid such as air and water. A room is heated utilizing this radiation. Then, the $CO_2$ refrigerant is introduced into the expander 6 and the sub-expander 23, and is expanded by the expander 6 and the sub-expander 23. Power recover by the expander 6 at the time of expanding operation is used for driving the compressor 1. At that time, an optimal amount of refrigerant flowing into the expander 6 is calculated from a high pressure refrigerant temperature, a high pressure refrigerant pressure and a refrigerant evaporation pressure detected on the side of the outlet of the indoor heat exchanger 8, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. In this case, torque of the electric generator 24 (load of the electric generator) is minimized. If the flow rate of refrigerant is greater than the calculated optimal refrigerant amount, the adjusting valve 7 is closed and torque of the electric generator 24 (load of the electric generator) is increased to reduce the flow rate of refrigerant flowing into an inlet of the expander 6.

The $CO_2$ refrigerant expanded by the sub-expander 23 and the expander 6 is introduced into the outdoor heat exchanger 3 through the second four-way valve 4 and is evaporated and suctions heat in the outdoor heat exchanger 3. The refrigerant which has been evaporated is drawn into the compressor 1 through the first four-way valve 2.

As described above, according to this embodiment, it is possible to adjust the flow rate of refrigerant of the outlet of the expander 6 by controlling the amount of refrigerant from the injection circuit 20, and it is possible to control the amount of refrigerant flowing into the expander 6 by closing the adjusting valve 7 and changing the torque of the electric generator 24 (i.e., load of the electric generator) connected to the sub-expander 23 to adjust a pressure in the outlet of the expander 6. Therefore, power can efficiently be recovered in the expander 6, and more power can be recovered from the refrigeration cycle by utilizing the power recover from the sub-expander 23 for generating electricity in the electric generator 24.

A refrigeration cycle apparatus according to another embodiment of the present invention will be explained with reference to the drawing based on a heat pump type cooling and heating air conditioner.

Figure 5:
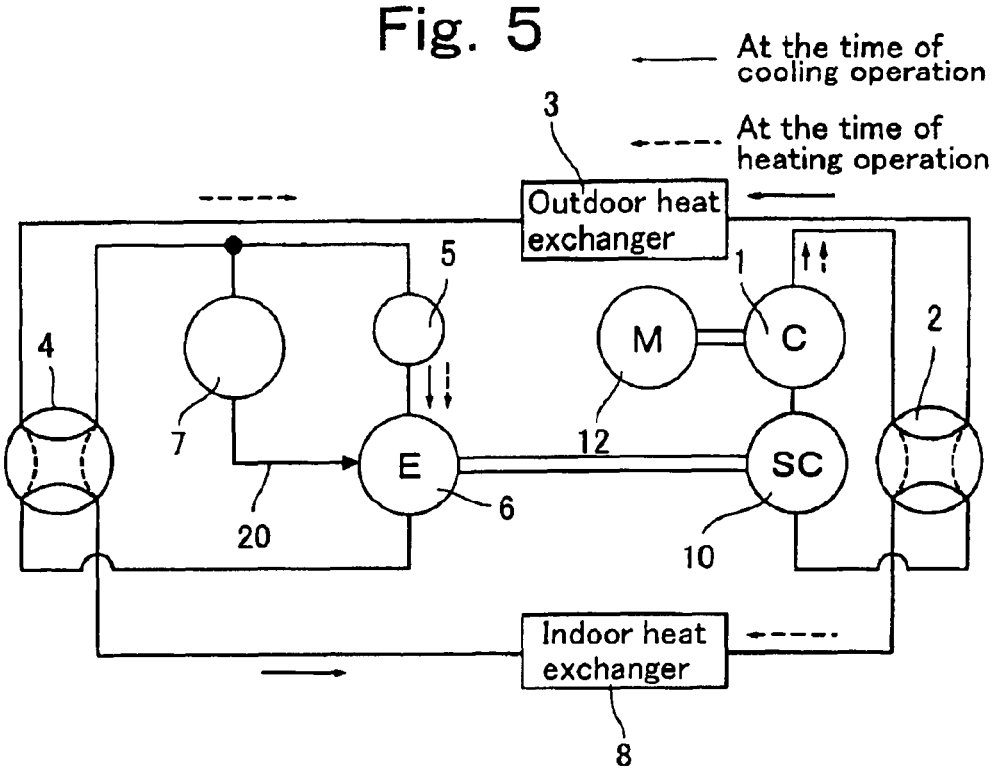
FIG. 5 shows a structure of a heat pump type cooling and heating air conditioner according to another embodiment of the invention.

FIG. 5 shows a structure of the heat pump type cooling and heating air conditioner of this embodiment.

As shown in FIG. 5, the heat pump type cooling and heating air conditioner of this embodiment uses a $CO_2$ refrigerant as refrigerant, and comprises a refrigerant circuit in which a compressor 1 having a motor 12, an outdoor heat exchanger 3, an expander 6, an indoor heat exchanger 8 and an auxiliary compressor 10 are connected to one another through pipes.

The expander 6 is provided at its inflow side with a pre-expansion valve 5.

The refrigerant circuit is provided with an injection circuit 20 which introduces high pressure refrigerant on the side of the outlet of the outdoor heat exchanger 3 in a halfway of the expansion process of the expander 6. The injection circuit 20 is provided with an adjusting valve 7 which adjusts an amount of refrigerant flowing through the injection circuit 20.

A drive shaft of the expander 6 and a drive shaft of the auxiliary compressor 10 are connected to each other, and the auxiliary compressor 10 is driven by power recover by the expander 6.

The refrigerant circuit includes a first four-way valve 2 to which a discharge side pipe of the compressor 1 and a suction side pipe of the auxiliary compressor 10 are connected, and a second four-way valve 4 to which a suction side pipe of the pre-expansion valve 5, a discharge side pipe of the expander 6 and the injection circuit 20 are connected.

The operation of the heat pump type cooling and heating air conditioner of this embodiment will be explained.

First, a cooling operation mode in which the outdoor heat exchanger 3 is used as a gas cooler and the indoor heat exchanger 8 is used as an evaporator will be explained. A flow of the refrigerant in the cooling operation mode is shown with solid arrows in the drawing.

Refrigerant at the time of the cooling operation mode is compressed at a high temperature and under a high pressure by the compressor 1 which is driven by the motor 12 and is discharged. The refrigerant is introduced into the outdoor heat exchanger 3 through the first four-way valve 2. In the outdoor heat exchanger 3, since $CO_2$ refrigerant is in a supercritical state, the refrigerant is not brought into two-phase state, and dissipates heat to outside fluid such as air and water. Then, the $CO_2$ refrigerant is introduced into the pre-expansion valve 5 and the expander 6 and is expanded by the pre-expansion valve 5 and the expander 6. Power recover by the expander 6 at the time of expanding operation is used for driving the auxiliary compressor 10. At that time, an optimal amount of refrigerant flowing into the expander 6 is calculated from a high pressure refrigerant temperature, a high pressure refrigerant pressure and a refrigerant evaporation pressure detected on the side of the outlet of the outdoor heat exchanger 3, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the into the ejection circuit 20, thereby increasing the amount of refrigerant per one expansion process of the expander 6. If the flow rate of refrigerant is greater than the calculated optimal refrigerant amount, the opening of the pre-expansion valve 5 is reduced to reduce the flow rate of refrigerant flowing into an inlet of the expander 6.

The $CO_2$ refrigerant expanded by the pre-expansion valve 5 and the expander 6 is introduced into the indoor heat exchanger 8 through the second four-way valve 4 and is evaporated and suctions heat in the indoor heat exchanger 8. A room is cooled by this endotherm. The refrigerant which has been evaporated is introduced into the auxiliary compressor 10 through the first four-way valve 2 and supercharged by the auxiliary compressor 10, and drawn into the compressor 1.

Next, a heating operation mode in which the outdoor heat exchanger 3 is used as the evaporator and the indoor heat exchanger 8 is used as the gas cooler will be explained. A flow of a refrigerant in this heating operation mode is shown with dashed arrows in the drawing.

Refrigerant at the time of the heating operation mode is compressed at a high temperature and under a high pressure by the compressor 1 which is driven by the motor 12 and is discharged. The refrigerant is introduced into the indoor heat exchanger 8 through the first four-way valve 2. In the indoor heat exchanger 8, since $CO_2$ refrigerant is in a supercritical state, the refrigerant is not brought in to two-phase state, and dissipates heat to outside fluid such as air and water. A room is heated utilizing this radiation. Then, the $CO_2$ refrigerant is introduced into the pre-expansion valve 5 and the expander 6, and is expanded by the pre-expansion valve 5 and the expander 6. Power recover by the expander 6 at the time of expanding operation is used for driving the auxiliary compressor 10. At that time, an optimal amount of refrigerant flowing into the expander 6 is calculated from a high pressure refrigerant temperature, a high pressure refrigerant pressure and a refrigerant evaporation pressure detected on the side of the outlet of the indoor heat exchanger 8, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. If the flow rate of refrigerant is greater than the calculated optimal refrigerant amount, the opening of the pre-expansion valve 5 is reduced to reduce the flow rate of refrigerant flowing into an inlet of the expander 6.

The $CO_2$ refrigerant expanded by the pre-expansion valve 5 and the expander 6 is introduced into the outdoor heat exchanger 3 through the second four-way valve 4 and is evaporated and suctions heat in the outdoor heat exchanger 3. The refrigerant which has been evaporated is introduced into the auxiliary compressor 10 through the first four-way valve 2 and supercharged by the auxiliary compressor 10, and drawn into the compressor 1.

As described above, according to this embodiment, it is possible to adjust the flow rate of refrigerant of the inlet of the expander 6 by controlling the amount of refrigerant from the injection circuit 20, and it is possible to control the amount of refrigerant flowing into the expander 6 by changing the opening of the pre-expansion valve 5 to adjust a pressure in the inlet of the expander 6. Therefore, power can efficiently be recovered in the expander 6.

A refrigeration cycle apparatus according to another embodiment of the present invention will be explained with reference to the drawing based on a heat pump type cooling and heating air conditioner.

Figure 6:
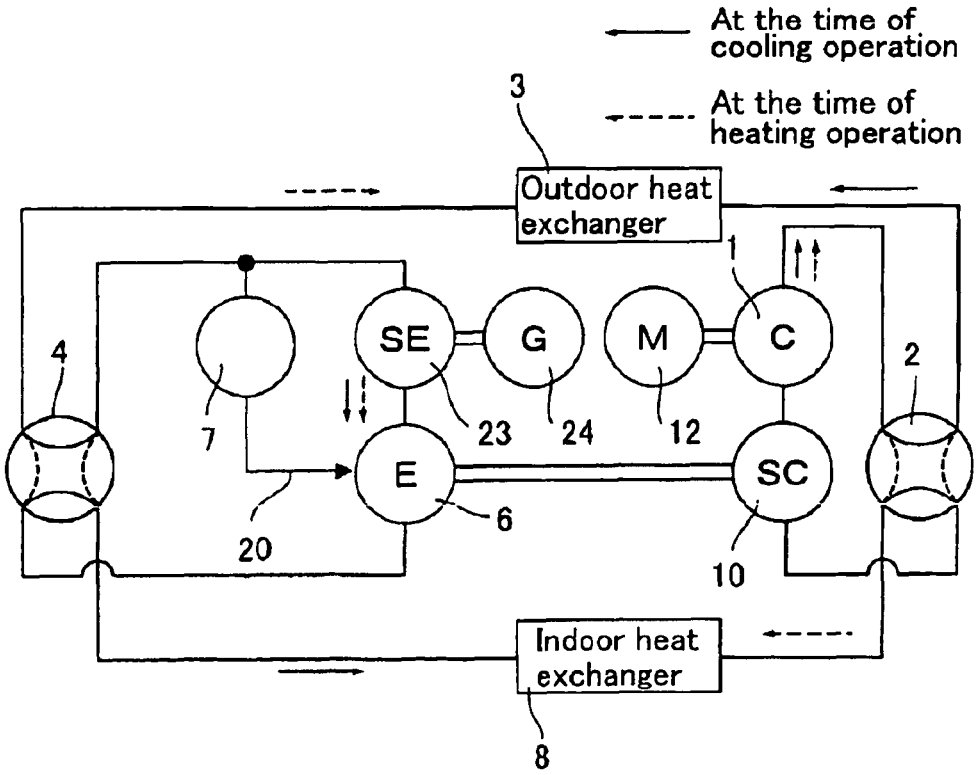
FIG. 6 shows a structure of a heat pump type cooling and heating air conditioner according to another embodiment of the invention.

FIG. 6 shows a structure of the heat pump type cooling and heating air conditioner of this embodiment.

As shown in FIG. 6, the heat pump type cooling and heating air conditioner of this embodiment uses a $CO_2$ refrigerant as refrigerant, and comprises a refrigerant circuit in which a compressor 1 having a motor 12, an outdoor heat exchanger 3, an expander 6, an indoor heat exchanger 8 and an auxiliary compressor 10 are connected to one another through pipes.

The expander 6 is provided at its inflow side with a sub-expander 23, and an electric generator 24 is connected to a drive shaft of the sub-expander 23.

The refrigerant circuit is provided with an injection circuit 20 which introduces high pressure refrigerant on the side of the outlet of the outdoor heat exchanger 3 in a halfway of the expansion process of the expander 6. The injection circuit 20 is provided with an adjusting valve 7 which adjusts an amount of refrigerant flowing through the injection circuit 20.

A drive shaft of the expander 6 and a drive shaft of the auxiliary compressor 10 are connected to each other, and the auxiliary compressor 10 is driven by power recover by the expander 6.

The refrigerant circuit includes a first four-way valve 2 to which a discharge side pipe of the compressor 1 and a suction side pipe of the auxiliary compressor 10 are connected, and a second four-way valve 4 to which a suction side pipe of the sub-expander 23, a discharge side pipe of the expander 6 and the injection circuit 20 are connected.

The operation of the heat pump type cooling and heating air conditioner of this embodiment will be explained.

First, a cooling operation mode in which the outdoor heat exchanger 3 is used as a gas cooler and the indoor heat exchanger 8 is used as an evaporator will be explained. A flow of the refrigerant in the cooling operation mode is shown with solid arrows in the drawing.

Refrigerant at the time of the cooling operation mode is compressed at a high temperature and under a high pressure by the compressor 1 which is driven by the motor 12 and is discharged. The refrigerant is introduced into the outdoor heat exchanger 3 through the first four-way valve 2. In the outdoor heat exchanger 3, since $CO_2$ refrigerant is in a supercritical state, the refrigerant is not brought into two-phase state, and dissipates heat to outside fluid such as air and water. Then, the $CO_2$ refrigerant is introduced into the sub-expander 23 and the expander 6 and is expanded by the sub-expander 23 and the expander 6. Power recover by the expander 6 at the time of expanding operation is used for driving the auxiliary compressor 10. At that time, an optimal amount of refrigerant flowing into the expander 6 is calculated from a high pressure refrigerant temperature, a high pressure refrigerant pressure and a refrigerant evaporation pressure detected on the side of the outlet of the outdoor heat exchanger 3, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. If the flow rate of refrigerant is greater than the calculated optimal refrigerant amount, torque of the electric generator 24 (load of the electric generator) is increased to reduce the flow rate of refrigerant flowing into an inlet of the expander 6.

The $CO_2$ refrigerant expanded by the sub-expander 23 and the expander 6 is introduced into the indoor heat exchanger 8 through the second four-way valve 4 and is evaporated and suctions heat in the indoor heat exchanger 8. A room is cooled by this endotherm. The refrigerant which has been evaporated is introduced into the auxiliary compressor 10 through the first four-way valve 2 and supercharged by the auxiliary compressor 10, and drawn into the compressor 1.

Next, a heating operation mode in which the outdoor heat exchanger 3 is used as the evaporator and the indoor heat exchanger 8 is used as the gas cooler will be explained. A flow of a refrigerant in this heating operation mode is shown with dashed arrows in the drawing.

Refrigerant at the time of the heating operation mode is compressed at a high temperature and under a high pressure by the compressor 1 which is driven by the motor 12 and is discharged. The refrigerant is introduced into the indoor heat exchanger 8 through the first four-way valve 2. In the indoor heat exchanger 8, since $CO_2$ refrigerant is in a supercritical state, the refrigerant is not brought into two-phase state, and dissipates heat to outside fluid such as air and water. A room is heated utilizing this radiation. Then, the $CO_2$ refrigerant is introduced into the sub-expander 23 and the expander 6, and is expanded by the sub-expander 23 and the expander 6. Power recover by the expander 6 at the time of expanding operation is used for driving the auxiliary compressor 10. At that time, an optimal amount of refrigerant flowing into the expander 6 is calculated from a high pressure refrigerant temperature, a high pressure refrigerant pressure and a refrigerant evaporation pressure detected on the side of the outlet of the indoor heat exchanger 8, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. If the flow rate of refrigerant is greater than the calculated optimal refrigerant amount, torque of the electric generator 24 (load of the electric generator) is increased to reduce the flow rate of refrigerant flowing into an inlet of the expander 6.

The $CO_2$ refrigerant expanded by the sub-expander 23 and the expander 6 is introduced into the outdoor heat exchanger 3 through the second four-way valve 4 and is evaporated and suctions heat in the outdoor heat exchanger 3. The refrigerant which has been evaporated is introduced into the auxiliary compressor 10 through the first four-way valve 2 and supercharged by the auxiliary compressor 10, and drawn into the compressor 1.

As described above, according to this embodiment, it is possible to adjust the flow rate of refrigerant of the outlet of the expander 6 by controlling the amount of refrigerant from the injection circuit 20, and it is possible to control the amount of refrigerant flowing into the expander 6 by changing the torque of the electric generator 24 (i.e., load of the electric generator) connected to the sub-expander 23 to adjust a pressure in the inlet of the expander 6. Therefore, power can efficiently be recovered in the expander 6, and more power can be recovered from the refrigeration cycle by utilizing the power recover from the sub-expander 23 for generating electricity in the electric generator 24.

A refrigeration cycle apparatus according to another embodiment of the present invention will be explained with reference to the drawing based on a heat pump type cooling and heating air conditioner.

Figure 7:
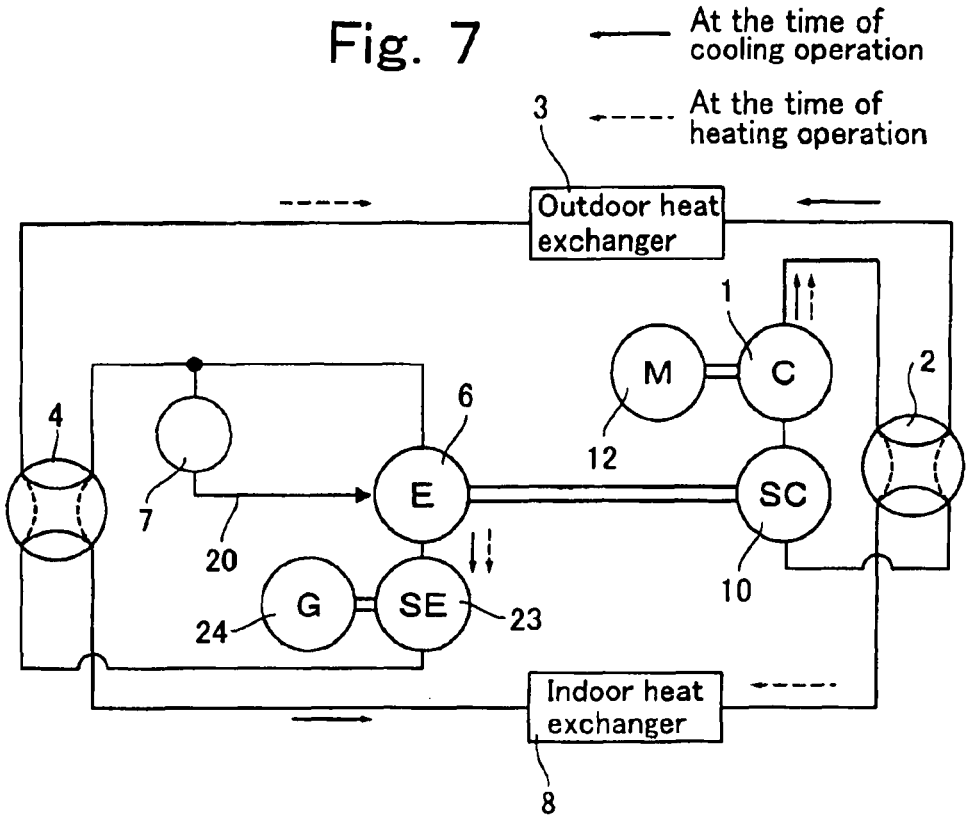
FIG. 7 shows a structure of a heat pump type cooling and heating air conditioner according to another embodiment of the invention.

FIG. 7 shows a structure of the heat pump type cooling and heating air conditioner of this embodiment.

As shown in FIG. 7, the heat pump type cooling and heating air conditioner of this embodiment uses a $CO_2$ refrigerant as refrigerant, and comprises a refrigerant circuit in which a compressor 1 having a motor 12, an outdoor heat exchanger 3, an expander 6, an indoor heat exchanger 8 and an auxiliary compressor 10 are connected to one another through pipes.

The expander 6 is provided at its discharge side with a sub-expander 23, and an electric generator 24 is connected to a drive shaft of the sub-expander 23.

The refrigerant circuit is provided with an injection circuit 20 which introduces high pressure refrigerant on the side of the outlet of the outdoor heat exchanger 3 in a halfway of the expansion process of the expander 6. The injection circuit 20 is provided with an adjusting valve 7 which adjusts an amount of refrigerant flowing through the injection circuit 20.

A drive shaft of the expander 6 and a drive shaft of the auxiliary compressor 10 are connected to each other, and the auxiliary compressor 10 is driven by power recover by the expander 6.

The refrigerant circuit includes a first four-way valve 2 to which a discharge side pipe of the compressor 1 and a suction side pipe of the auxiliary compressor 10 are connected, and a second four-way valve 4 to which a discharge side pipe of the sub-expander 23, an inflow side pipe of the expander 6 and the injection circuit 20 are connected.

The operation of the heat pump type cooling and heating air conditioner of this embodiment will be explained.

First, a cooling operation mode in which the outdoor heat exchanger 3 is used as a gas cooler and the indoor heat exchanger 8 is used as an evaporator will be explained. A flow of the refrigerant in the cooling operation mode is shown with solid arrows in the drawing.

Refrigerant at the time of the cooling operation mode is compressed at a high temperature and under a high pressure by the compressor 1 which is driven by the motor 12 and is discharged. The refrigerant is introduced into the outdoor heat exchanger 3 through the first four-way valve 2. In the outdoor heat exchanger 3, since $CO_2$ refrigerant is in a supercritical state, the refrigerant is not brought into two-phase state, and dissipates heat to outside fluid such as air and water. Then, the $CO_2$ refrigerant is introduced into the expander 6 and the sub-expander 23 and is expanded by the expander 6 and the sub-expander 23. Power recover by the expander 6 at the time of expanding operation is used for driving the auxiliary compressor 10. At that time, an optimal amount of refrigerant flowing into the expander 6 is calculated from a high pressure refrigerant temperature, a high pressure refrigerant pressure and a refrigerant evaporation pressure detected on the side of the outlet of the outdoor heat exchanger 3, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. In this case, torque of the electric generator 24 (load of the electric generator) is minimized. If the flow rate of refrigerant is greater than the calculated optimal refrigerant amount, the adjusting valve 7 is closed and torque of the electric generator 24 (load of the electric generator) is increased to reduce the flow rate of refrigerant flowing into an inlet of the expander 6.

The $CO_2$ refrigerant expanded by the sub-expander 23 and the expander 6 is introduced into the indoor heat exchanger 8 through the second four-way valve 4 and is evaporated and suctions heat in the indoor heat exchanger 8. A room is cooled by this endotherm. The refrigerant which has been evaporated is introduced into the auxiliary compressor 10 through the first four-way valve 2 and supercharged by the auxiliary compressor 10, and drawn into the compressor 1.

Next, a heating operation mode in which the outdoor heat exchanger 3 is used as the evaporator and the indoor heat exchanger 8 is used as the gas cooler will be explained. A flow of a refrigerant in this heating operation mode is shown with dashed arrows in the drawing.

Refrigerant at the time of the heating operation mode is compressed at a high temperature and under a high pressure by the compressor 1 which is driven by the motor 12 and is discharged. The refrigerant is introduced into the indoor heat exchanger 8 through the first four-way valve 2. In the indoor heat exchanger 8, since $CO_2$ refrigerant is in a supercritical state, the refrigerant is not brought into two-phase state, and dissipates heat to outside fluid such as air and water. A room is heated utilizing this radiation. Then, the $CO_2$ refrigerant is introduced into the expander 6 and the sub-expander 23, and is expanded by the expander 6 at the time of expanding operation recover by the expander 6 at the time of expanding operation is used for driving the auxiliary compressor 10. At that time, an optimal amount of refrigerant flowing into the expander 6 is calculated from a high pressure refrigerant temperature, a high pressure refrigerant pressure and a refrigerant evaporation pressure detected on the side of the outlet of the indoor heat exchanger 8, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. If the flow rate of refrigerant is greater than the calculated optimal refrigerant amount, the adjusting valve 7 is closed and torque of the electric generator 24 (load of the electric generator) is increased to reduce the flow rate of refrigerant flowing into an inlet of the expander 6.

The $CO_2$ refrigerant expanded by the sub-expander 23 and the expander 6 is introduced into the outdoor heat exchanger 3 through the second four-way valve 4 and is evaporated and suctions heat in the outdoor heat exchanger 3. The refrigerant which has been evaporated is introduced into the auxiliary compressor 10 through the first four-way valve 2 and supercharged by the auxiliary compressor 10, and drawn into the compressor 1.

As described above, according to this embodiment, it is possible to adjust the flow rate of refrigerant of the outlet of the expander 6 by controlling the amount of refrigerant from the injection circuit 20, and it is possible to control the amount of refrigerant flowing into the expander 6 by closing the adjusting valve 7 and changing the torque of the electric generator 24 (i.e., load of the electric generator) connected to the sub-expander 23 to adjust a pressure in the outlet of the expander 6. Therefore, power can efficiently be recovered in the expander 6, and more power can be recovered from the refrigeration cycle by utilizing the power recover from the sub-expander 23 for generating electricity in the electric generator 24.

A refrigeration cycle apparatus according to another embodiment of the present invention will be explained with reference to the drawing based on a heat pump type cooling and heating air conditioner.

Figure 8:
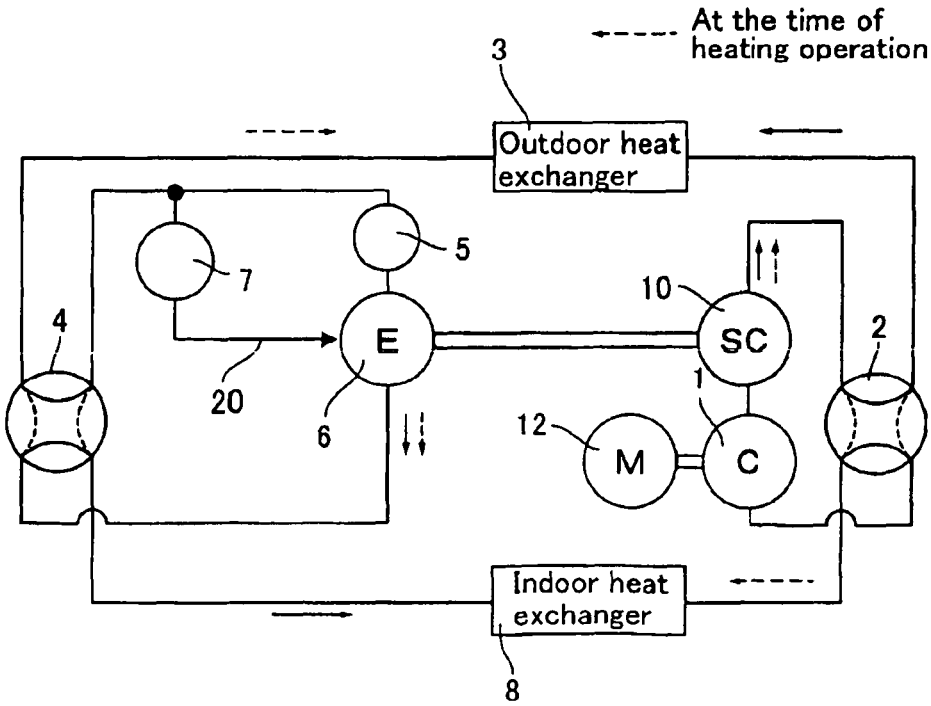
FIG. 8 shows a structure of a heat pump type cooling and heating air conditioner according to another embodiment of the invention.

FIG. 8 shows a structure of the heat pump type cooling and heating air conditioner of this embodiment.

As shown in FIG. 8, the heat pump type cooling and heating air conditioner of this embodiment uses a $CO_2$ refrigerant as refrigerant, and comprises a refrigerant circuit in which a compressor 1 having a motor 12, an auxiliary compressor 10, an outdoor heat exchanger 3, an expander 6 and an indoor heat exchanger 8 are connected to one another through pipes.

The expander 6 is provided at its inflow side with a pre-expansion valve 5.

The refrigerant circuit is provided with an injection circuit 20 which introduces high pressure refrigerant on the side of the outlet of the outdoor heat exchanger 3 in a halfway of the expansion process of the expander 6. The injection circuit 20 is provided with an adjusting valve 7 which adjusts an amount of refrigerant flowing through the injection circuit 20.

A drive shaft of the expander 6 and a drive shaft of the auxiliary compressor 10 are connected to each other, and the auxiliary compressor 10 is driven by power recover by the expander 6.

The refrigerant circuit includes a first four-way valve 2 to which a suction side pipe of the compressor 1 and a discharge side pipe of the auxiliary compressor 10 are connected, and a second four-way valve 4 to which a suction side pipe of the pre-expansion valve 5, a discharge side pipe of the expander 6 and the injection circuit 20 are connected.

The operation of the heat pump type cooling and heating air conditioner of this embodiment will be explained.

First, a cooling operation mode in which the outdoor heat exchanger 3 is used as a gas cooler and the indoor heat exchanger 8 is used as an evaporator will be explained. A flow of the refrigerant in the cooling operation mode is shown with solid arrows in the drawing.

Refrigerant at the time of the cooling operation mode is compressed at a high temperature and under a high pressure by the compressor 1 which is driven by the motor 12 and is discharged. The refrigerant is introduced into the auxiliary compressor 10 and further super-pressurized by the auxiliary compressor 10 and then, is introduced into the outdoor heat exchanger 3 through the first four-way valve 2. In the outdoor heat exchanger 3, since $CO_2$ refrigerant is in a supercritical state, the refrigerant is not brought into two-phase state, and dissipates heat to outside fluid such as air and water. Then, the $CO_2$ refrigerant is introduced into the pre-expansion valve 5, the expander 6 and the sub-expander 21 and is expanded by the pre-expansion valve 5, the expander 6 and the sub-expander 21. Power recover by the expander 6 at the time of expanding operation is used for driving the auxiliary compressor 10. At that time, an optimal amount of refrigerant flowing into the expander 6 is calculated from a high pressure refrigerant temperature, a high pressure refrigerant pressure and a refrigerant evaporation pressure detected on the side of the outlet of the outdoor heat exchanger 3, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. If the flow rate of refrigerant is greater than the calculated optimal refrigerant amount, the opening of the pre-expansion valve 5 is reduced to reduce the flow rate of refrigerant flowing into an inlet of the expander 6.

The $CO_2$ refrigerant expanded by the pre-expansion valve 5 and the expander 6 is introduced into the indoor heat exchanger 8 through the second four-way valve 4 and is evaporated and suctions heat in the indoor heat exchanger 8. A room is cooled by this endotherm. The refrigerant which has been evaporated is drawn into the compressor 1 through the first four-way valve 2.

Next, a heating operation mode in which the outdoor heat exchanger 3 is used as the evaporator and the indoor heat exchanger 8 is used as the gas cooler will be explained. A flow of a refrigerant in this heating operation mode is shown with dashed arrows in the drawing.

Refrigerant at the time of the heating operation mode is compressed at a high temperature and under a high pressure by the compressor 1 which is driven by the motor 12 and is discharged. The refrigerant is introduced into the auxiliary compressor 10 and further super-pressurized by the auxiliary compressor 10 and then, is introduced into the indoor heat exchanger 8 through the first four-way valve 2. In the indoor heat exchanger 8, since $CO_2$ refrigerant is in a supercritical state, the refrigerant is not brought into two-phase state, and dissipates heat to outside fluid such as air and water. A room is heated utilizing this radiation. Then, the $CO_2$ refrigerant is introduced into the pre-expansion valve 5, the expander 6 and the sub-expander 21 and is expanded by the pre-expansion valve 5, the expander 6 and the sub-expander 21. Power recover by the expander 6 at the time of expanding operation is used for driving the auxiliary compressor 10. At that time, an optimal amount of refrigerant flowing into the expander 6 is calculated from a high pressure refrigerant temperature, a high pressure refrigerant pressure and a refrigerant evaporation pressure detected on the side of the outlet of the indoor heat exchanger 8, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. If the flow rate of refrigerant is greater than the calculated optimal refrigerant amount, the opening of the pre-expansion valve 5 is reduced to reduce the flow rate of refrigerant flowing into an inlet of the expander 6.

The $CO_2$ refrigerant expanded by the pre-expansion valve 5 and the expander 6 is introduced into the outdoor heat exchanger 3 through the second four-way valve 4 and is evaporated and suctions heat in the outdoor heat exchanger 3. The refrigerant which has been evaporated is drawn into the compressor 1 through the first four-way valve 2.

As described above, according to this embodiment, it is possible to adjust the flow rate of refrigerant of the outlet of the expander 6 by controlling the amount of refrigerant from the injection circuit 20, and it is possible to control the amount of refrigerant flowing into the expander 6 by changing the opening of the pre-expansion valve 5 to adjust a pressure in the inlet of the expander 6. Therefore, power can efficiently be recovered in the expander 6.

A refrigeration cycle apparatus according to another embodiment of the present invention will be explained with reference to the drawing based on a heat pump type cooling and heating air conditioner.

Figure 9:
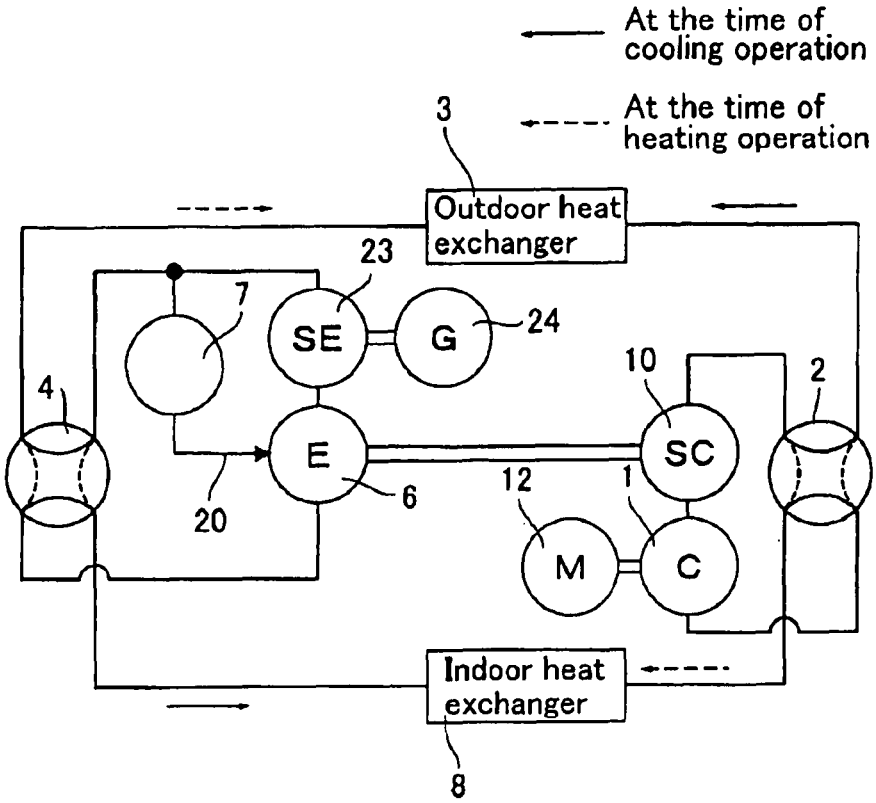
FIG. 9 shows a structure of a heat pump type cooling and heating air conditioner according to another embodiment of the invention.

FIG. 9 shows a structure of the heat pump type cooling and heating air conditioner of this embodiment.

As shown in FIG. 9, the heat pump type cooling and heating air conditioner of this embodiment uses a $CO_2$ refrigerant as refrigerant, and comprises a refrigerant circuit in which a compressor 1 having a motor 12, an auxiliary compressor 10, an outdoor heat exchanger 3, an expander 6 and an indoor heat exchanger 8 are connected to one another through pipes.

The expander 6 is provided at its inflow side with a sub-expander 23, and an electric generator 24 is connected to a drive shaft of the sub-expander 23.

The refrigerant circuit is provided with an injection circuit 20 which introduces high pressure refrigerant on the side of the outlet of the outdoor heat exchanger 3 in a halfway of the expansion process of the expander 6. The injection circuit 20 is provided with an adjusting valve 7 which adjusts an amount of refrigerant flowing through the injection circuit 20.

A drive shaft of the expander 6 and a drive shaft of the auxiliary compressor 10 are connected to each other, and the auxiliary compressor 10 is driven by power recover by the expander 6.

The refrigerant circuit includes a first four-way valve 2 to which a suction side pipe of the compressor 1 and a discharge side pipe of the auxiliary compressor 10 are connected, and a second four-way valve 4 to which a suction side pipe of the sub-expander 23, a discharge side pipe of the expander 6 and the injection circuit 20 are connected.

The operation of the heat pump type cooling and heating air conditioner of this embodiment will be explained.

First, a cooling operation mode in which the outdoor heat exchanger 3 is used as a gas cooler and the indoor heat exchanger 8 is used as an evaporator will be explained. A flow of the refrigerant in the cooling operation mode is shown with solid arrows in the drawing.

Refrigerant at the time of the cooling operation mode is compressed at a high temperature and under a high pressure by the compressor 1 which is driven by the motor 12 and is discharged. The refrigerant is introduced into the auxiliary compressor 10 and further super-pressurized by the auxiliary compressor 10 and then, is introduced into the outdoor heat exchanger 3 through the first four-way valve 2. In the outdoor heat exchanger 3, since $CO_2$ refrigerant is in a supercritical state, the refrigerant is not brought into two-phase state, and dissipates heat to outside fluid such as air and water. Then, the $CO_2$ refrigerant is introduced into the sub-expander 23 and the expander 6 and is expanded by the sub-expander 23 and the expander 6. Power recover by the expander 6 at the time of expanding operation is used for driving the auxiliary compressor 10. At that time, an optimal amount of refrigerant flowing into the expander 6 is calculated from a high pressure refrigerant temperature, a high pressure refrigerant pressure and a refrigerant evaporation pressure detected on the side of the outlet of the outdoor heat exchanger 3, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. If the flow rate of refrigerant is greater than the calculated optimal refrigerant amount, torque of the electric generator 24 (load of the electric generator) is increased to reduce the flow rate of refrigerant flowing into an inlet of the expander 6.

The $CO_2$ refrigerant expanded by the sub-expander 23 and the expander 6 is introduced into the indoor heat exchanger 8 through the second four-way valve 4 and is evaporated and suctions heat in the indoor heat exchanger 8. A room is cooled by this endotherm. The refrigerant which has been evaporated is drawn into the compressor 1 through the first four-way valve 2.

Next, a heating operation mode in which the outdoor heat exchanger 3 is used as the evaporator and the indoor heat exchanger 8 is used as the gas cooler will be explained. A flow of a refrigerant in this heating operation mode is shown with dashed arrows in the drawing.

Refrigerant at the time of the heating operation mode is compressed at a high temperature and under a high pressure by the compressor 1 which is driven by the motor 12 and is discharged. The refrigerant is introduced into the auxiliary compressor 10 and further super-pressurized by the auxiliary compressor 10 and then, is introduced into the indoor heat exchanger 8 through the first four-way valve 2. In the indoor heat exchanger 8, since $CO_2$ refrigerant is in a supercritical state, the refrigerant is not brought into two-phase state, and dissipates heat to outside fluid such as air and water. A room is heated utilizing this radiation. Then, the $CO_2$ refrigerant is introduced into the sub-expander 23 and the expander 6 and is expanded by the sub-expander 23 and the expander A. Power recover by the expander 6 at the time of expanding operation is used for driving the auxiliary compressor 10. At that time, an optimal amount of refrigerant flowing into the expander 6 is calculated from a high pressure refrigerant temperature, a high pressure refrigerant pressure and a refrigerant evaporation pressure detected on the side of the outlet of the indoor heat exchanger 8, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. If the flow rate of refrigerant is greater than the calculated optimal refrigerant amount, torque of the electric generator 24 (load of the electric generator) is increased to reduce the flow rate of refrigerant flowing into an inlet of the expander 6.

The $CO_2$ refrigerant expanded by the sub-expander 23 and the expander 6 is introduced into the outdoor heat exchanger 3 through the second four-way valve 4 and is evaporated and suctions heat in the outdoor heat exchanger 3. The refrigerant which has been evaporated is drawn into the compressor 1 through the first four-way valve 2.

As described above, according to this embodiment, it is possible to adjust the flow rate of refrigerant of the outlet of the expander 6 by controlling the amount of refrigerant from the injection circuit 20, and it is possible to control the amount of refrigerant flowing into the expander 6 by changing the torque of the electric generator 24 (i.e., load of the electric generator) connected to the sub-expander 23 and by adjusting a pressure of the inlet of the expander 6. Therefore, it is possible to efficiently recover power in the expander 6, and to recover more power from the refrigeration cycle by utilizing the power recover by the sub-expander 23 for generating electricity in the electric generator 24.

A refrigeration cycle apparatus according to another embodiment of the present invention will be explained with reference to the drawing based on a heat pump type cooling and heating air conditioner.

Figure 10:
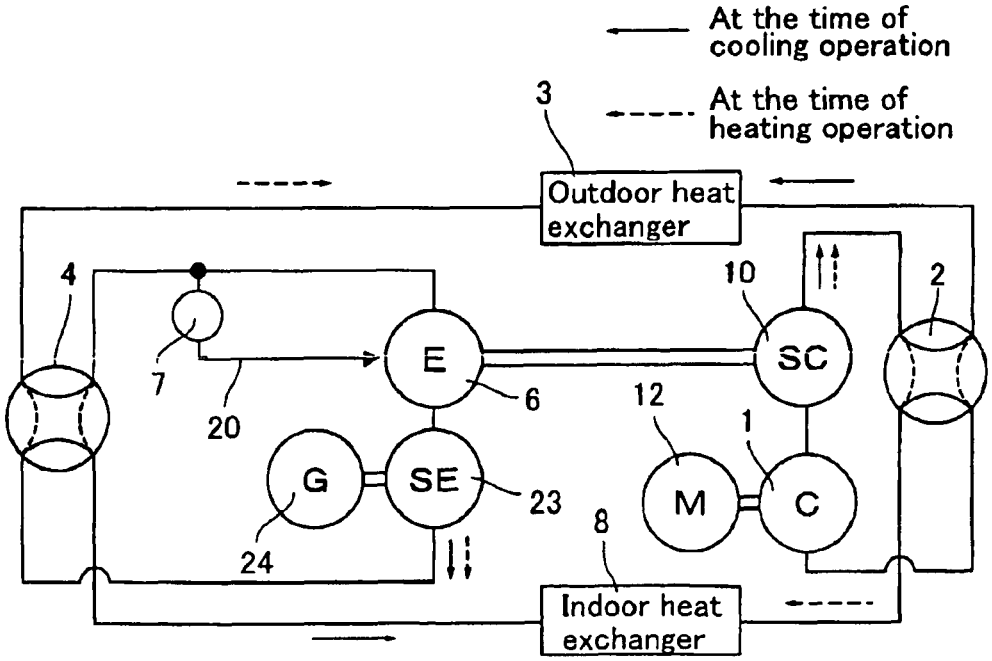
FIG. 10 shows a structure of a heat pump type cooling and heating air conditioner according to another embodiment of the invention.

FIG. 10 shows a structure of the heat pump type cooling and heating air conditioner of this embodiment.

As shown in FIG. 10, the heat pump type cooling and heating air conditioner of this embodiment uses a $CO_2$ refrigerant as refrigerant, and comprises a refrigerant circuit in which a compressor 1 having a motor 12, an auxiliary compressor 10, an outdoor heat exchanger 3, an expander 6 and an indoor heat exchanger 8 are connected to one another through pipes.

The expander 6 is provided at its discharge side with a sub-expander 23, and an electric generator 24 is connected to a drive shaft of the sub-expander 23.

The refrigerant circuit is provided with an injection circuit 20 which introduces high pressure refrigerant on the side of the outlet of the outdoor heat exchanger 3 in a halfway of the expansion process of the expander 6. The injection circuit 20 is provided with an adjusting valve 7 which adjusts an amount of refrigerant flowing through the injection circuit 20.

A drive shaft of the expander 6 and a drive shaft of the auxiliary compressor 10 are connected to each other, and the auxiliary compressor 10 is driven by power recover by the expander 6.

The refrigerant circuit includes a first four-way valve 2 to which a suction side pipe of the compressor 1 and a discharge side pipe of the auxiliary compressor 10 are connected, and a second four-way valve 4 to which a discharge side pipe of the sub-expander 23, an inflow side pipe of the expander 6 and the injection circuit 20 are connected.

The operation of the heat pump type cooling and heating air conditioner of this embodiment will be explained.

First, a cooling operation mode in which the outdoor heat exchanger 3 is used as a gas cooler and the indoor heat exchanger 8 is used as an evaporator will be explained. A flow of the refrigerant in the cooling operation mode is shown with solid arrows in the drawing.

Refrigerant at the time of the cooling operation mode is compressed at a high temperature and under a high pressure by the compressor 1 which is driven by the motor 12 and is discharged. The refrigerant is introduced into the auxiliary compressor 10 and further super-pressurized by the auxiliary compressor 10 and then, is introduced into the outdoor heat exchanger 3 through the first four-way valve 2. In the outdoor heat exchanger 3, since $CO_2$ refrigerant is in a supercritical state, the refrigerant is not brought into two-phase state, and dissipates heat to outside fluid such as air and water. Then, the $CO_2$ refrigerant is introduced into the expander 6 and the sub-expander 23 and is expanded by the expander 6 and the sub-expander 23. Power recover by the expander 6 at the time of expanding operation is used for driving the auxiliary compressor 10. At that time, an optimal amount of refrigerant flowing into the expander 6 is calculated from a high pressure refrigerant temperature, a high pressure refrigerant pressure and a refrigerant evaporation pressure detected on the side of the outlet of the outdoor heat exchanger 3, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. In this case, torque of the electric generator 24 (load of the electric generator) is minimized. If the flow rate of refrigerant is greater than the calculated optimal refrigerant amount, the adjusting valve 7 is closed and the electric generator 24 is connected to the sub-expander 23 to reduced the low pressure side pressure, thereby reducing the flow rate of refrigerant flowing into an inlet of the expander 6.

The $CO_2$ refrigerant expanded by the sub-expander 23 and the expander 6 is introduced into the indoor heat exchanger 8 through the second four-way valve 4 and is evaporated and suctions heat in the indoor heat exchanger 8. A room is cooled by this endotherm. The refrigerant which has been evaporated is drawn into the compressor 1 through the first four-way valve 2.

Next, a heating operation mode in which the outdoor heat exchanger 3 is used as the evaporator and the indoor heat exchanger 8 is used as the gas cooler will be explained. A flow of a refrigerant in this heating operation mode is shown with dashed arrows in the drawing.

Refrigerant at the time of the heating operation mode is compressed at a high temperature and under a high pressure by the compressor 1 which is driven by the motor 12 and is discharged. The refrigerant is introduced into the auxiliary compressor 10 and further super-pressurized by the auxiliary compressor 10 and then, is introduced into the indoor heat exchanger 8 through the first four-way valve 2. In the indoor heat exchanger 8, since $CO_2$ refrigerant is in a supercritical state, the refrigerant is not brought into two-phase state, and dissipates heat to outside fluid such as air and water. A room is heated utilizing this radiation. Then, the $CO_2$ refrigerant is introduced into the expander 6 and the sub-expander 23 and is expanded by the expander 6 and the sub-expander 23. Power recover by the expander 6 at the time of expanding operation is used for driving the auxiliary compressor 10. At that time, an optimal amount of refrigerant flowing into the expander 6 is calculated from a high pressure refrigerant temperature, a high pressure refrigerant pressure and a refrigerant evaporation pressure detected on the side of the outlet of the indoor heat exchanger 8, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. In this case, torque of the electric generator 24 (load of the electric generator) is minimized. If the flow rate of refrigerant is greater than the calculated optimal refrigerant amount, the adjusting valve 7 is closed, and torque of the electric generator 24 (load of the electric generator) is increased to reduce the flow rate of refrigerant flowing into an inlet of the expander 6.

The $CO_2$ refrigerant expanded by the sub-expander 23 and the expander 6 is introduced into the outdoor heat exchanger 3 through the second four-way valve 4 and is evaporated and suctions heat in the outdoor heat exchanger 3. The refrigerant which has been evaporated is drawn into the compressor 1 through the first four-way valve 2.

As described above, according to this embodiment, it is possible to adjust the flow rate of refrigerant of the outlet of the expander 6 by controlling the amount of refrigerant from the injection circuit 20, and it is possible to control the amount of refrigerant flowing into the expander 6 by closing the adjusting valve 7 and by changing the torque of the electric generator 24 (i.e., load of the electric generator) connected to the sub-expander 23 and by adjusting a pressure of the outlet of the expander 6. Therefore, it is possible to efficiently recover power in the expander 6, and to recover more power from the refrigeration cycle by utilizing the power recover by the sub-expander 23 for generating electricity in the electric generator 24.

A refrigeration cycle apparatus according to another embodiment of the present invention will be explained with reference to the drawing based on a heat pump type cooling and heating air conditioner.

Figure 11:
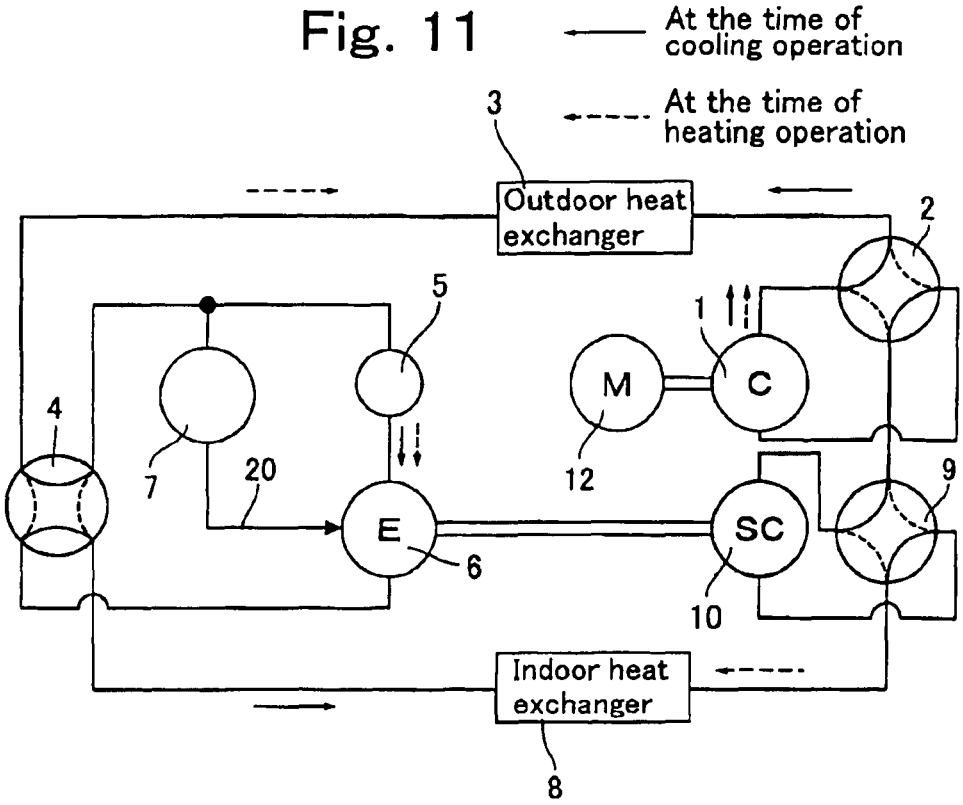
FIG. 11 shows a structure of a heat pump type cooling and heating air conditioner according to another embodiment of the invention.

FIG. 11 shows a structure of the heat pump type cooling and heating air conditioner of this embodiment.

As shown in FIG. 11, the heat pump type cooling and heating air conditioner of this embodiment uses a $CO_2$ refrigerant as refrigerant, and comprises a refrigerant circuit in which a compressor 1 having a motor 12, an outdoor heat exchanger 3, an expander 6, an indoor heat exchanger 8 and an auxiliary compressor 10 are connected to one another through pipes.

The expander 6 is provided at its inflow side with a pre-expansion valve 5.

The refrigerant circuit is provided with an injection circuit 20 which introduces high pressure refrigerant on the side of the outlet of the outdoor heat exchanger 3 in a halfway of the expansion process of the expander 6. The injection circuit 20 is provided with an adjusting valve 7 which adjusts an amount of refrigerant flowing through the injection circuit 20.

A drive shaft of the expander 6 and a drive shaft of the auxiliary compressor 10 are connected to each other, and the auxiliary compressor 10 is driven by power recover by the expander 6.

The refrigerant circuit comprises a first four-way valve 2 to which a discharge side pipe and a suction side pipe of the compressor 1 are connected, a second four-way valve 4 to which a discharge side pipe and a suction side pipe of the expander 6 and the injection circuit 20 are connected, and a third four-way valve 9 to which a discharge side pipe and a suction side pipe of the auxiliary compressor 10 are connected. In the case of refrigerant flow in which the outdoor heat exchanger 3 is used as a gas cooler and the indoor heat exchanger 8 is used as an evaporator, the first four-way valve 2 and the third four-way valve 9 are switched over so that the discharge side of the auxiliary compressor 10 becomes the suction side of the compressor 1. In the case of refrigerant flow in which the outdoor heat exchanger 3 is used as the evaporator and the indoor heat exchanger 8 is used as the gas cooler, the first four-way valve 2 and the third four-way valve 9 are switched over so that the discharge side of the compressor 1 becomes the suction side of the auxiliary compressor 10. By switching the second four-way valve 4, a direction of the refrigerant flowing through the expander 6 becomes always the same direction.

The operation of the heat pump type cooling and heating air conditioner of this embodiment will be explained.

First, a cooling operation mode in which the outdoor heat exchanger 3 is used as a gas cooler and the indoor heat exchanger 8 is used as an evaporator will be explained. A flow of the refrigerant in the cooling operation mode is l shown with solid arrows in the drawing.

Refrigerant at the time of the cooling operation mode is compressed at a high temperature and under a high pressure by the compressor 1 which is driven by the motor 12 and is discharged. The refrigerant is introduced into the outdoor heat exchanger 3 through the first four-way valve 2. In the outdoor heat exchanger 3, since $CO_2$ refrigerant is in a supercritical state, the refrigerant is not brought into two-phase state, and dissipates heat to outside fluid such as air and water. Then, the $CO_2$ refrigerant is introduced into the pre-expansion valve 5, the expander 6 and the sub-expander 21 and is expanded by the pre-expansion valve 5, the expander 6 and the sub-expander 21. Power recover by the expander 6 at the time of expanding operation is used for driving the auxiliary compressor 10. At that time, an optimal amount of refrigerant flowing into the expander 6 is calculated from a high pressure refrigerant temperature, a high pressure refrigerant pressure and a refrigerant evaporation pressure detected on the side of the outlet of the outdoor heat exchanger 3, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. If the flow rate of refrigerant is greater than the calculated optimal refrigerant amount, the opening of the pre-expansion valve 5 is reduced to reduce the flow rate of refrigerant flowing into an inlet of the expander 6.

The $CO_2$ refrigerant expanded by the pre-expansion valve 5 and the expander 6 is introduced into the indoor heat exchanger 8 through the second four-way valve 4 and is evaporated and suctions heat in the indoor heat exchanger 8. A room is cooled by this endotherm. The refrigerant which has been evaporated is introduced into the auxiliary compressor 10 through the third four-way valve 9 and supercharged by the auxiliary compressor 10, and drawn into the compressor 1.

Next, a heating operation mode in which the outdoor heat exchanger 3 is used as the evaporator and the indoor heat exchanger 8 is used as the gas cooler will be explained. A flow of a refrigerant in this heating operation mode is shown with dashed arrows in the drawing.

Refrigerant at the time of the heating operation mode is compressed at a high temperature and under a high pressure by the compressor 1 which is driven by the motor 12 and is discharged. The refrigerant is introduced into the auxiliary compressor 10 through the first four-way valve 2 and the third four-way valve 9 and further super-pressurized by the auxiliary compressor 10. The refrigerant whose pressure was increased by the auxiliary compressor 10 is introduced into the indoor heat exchanger 8 through the third four-way valve 9. In the indoor heat exchanger 8, since $CO_2$ refrigerant is in a supercritical state, the refrigerant is not brought into two-phase state, and dissipates heat to outside fluid such as air and water. A room is heated utilizing this radiation. Then, the $CO_2$ refrigerant is introduced into the pre-expansion valve 5, the expander 6 and the sub-expander 21 and is expanded by the pre-expansion valve 5, the expander 6 and the sub-expander 21. Power recover by the expander 6 at the time of expanding operation is used for driving the auxiliary compressor 10. At that time, an optimal amount of refrigerant flowing into the expander 6 is calculated from a high pressure refrigerant temperature, a high pressure refrigerant pressure and a refrigerant evaporation pressure detected on the side of the outlet of the indoor heat exchanger 8, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. If the flow rate of refrigerant is greater than the calculated optimal refrigerant amount, the opening of the pre-expansion valve 5 is reduced to reduce the flow rate of refrigerant flowing into an inlet of the expander 6.

The $CO_2$ refrigerant expanded by the pre-expansion valve 5 and the expander 6 is introduced into the outdoor heat exchanger 3 through the second four-way valve 4 and is evaporated and suctions heat in the outdoor heat exchanger 3. The refrigerant which has been evaporated is drawn into the compressor 1 through the first four-way valve 2.

As described above, according to this embodiment, it is possible to adjust the flow rate of refrigerant of the outlet of the expander 6 by controlling the amount of refrigerant from the injection circuit 20, and it is possible to control the amount of refrigerant flowing into the expander 6 by changing the opening of the pre-expansion valve 5 to adjust a pressure of the inlet of the expander 6. Therefore, it is possible to efficiently recover power in the expander 6, and to recover more power from the refrigeration cycle by utilizing the power recover by the sub-expander 21 for generating electricity in the electric generator 22.

Further, according to this embodiment, the compressor 1 which compresses refrigerant and the expander 6 and the auxiliary compressor 10 which recover the power are separated from each other. The refrigeration cycle is switched such that the refrigerant is supercharged by the auxiliary compressor 10 at the time of the cooling operation mode, and the refrigerant is super-pressurized at the time of the heating operation mode. With this structure, it is possible to allow the expander 6 to operate as a supercharging type expander which is suitable for cooling, and as a super-pressurizing type expander which is suitable for heating.

A refrigeration cycle apparatus according to another embodiment of the present invention will be explained with reference to the drawing based on a heat pump type cooling and heating air conditioner.

Figure 12:
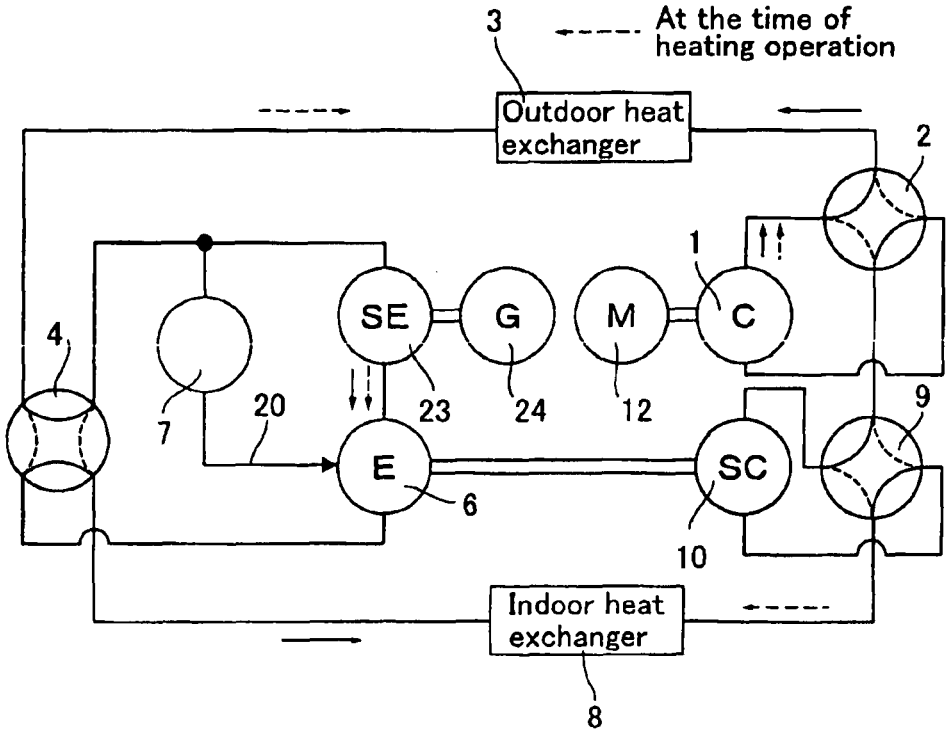
FIG. 12 shows a structure of a heat pump type cooling and heating air conditioner according to another embodiment of the invention.

FIG. 12 shows a structure of the heat pump type cooling and heating air conditioner of this embodiment.

As shown in FIG. 12, the heat pump type cooling and heating air conditioner of this embodiment uses a $CO_2$ refrigerant as refrigerant, and comprises a refrigerant circuit in which a compressor 1 having a motor 12, an outdoor heat exchanger 3, an expander 6, an indoor heat exchanger 8 and an auxiliary compressor 10 are connected to one another through pipes.

The expander 6 is provided at its inflow side with a sub-expander 23, and an electric generator 24 is connected to a drive shaft of the sub-expander 23.

The refrigerant circuit is provided with an injection circuit 20 which introduces high pressure refrigerant on the side of the outlet of the outdoor heat exchanger 3 in a halfway of the expansion process of the expander 6. The injection circuit 20 is provided with an adjusting valve 7 which adjusts an amount of refrigerant flowing through the injection circuit 20.

A drive shaft of the expander 6 and a drive shaft of the auxiliary compressor 10 are connected to each other, and the auxiliary compressor 10 is driven by power recover by the expander 6.

The refrigerant circuit comprises a first four-way valve 2 to which a discharge side pipe and a suction side pipe of the compressor 1 are connected, a second four-way valve 4 to which a discharge side pipe and a suction side pipe of the expander 6 and the injection circuit 20 are connected, and a third four-way valve 9 to which a discharge side pipe and a suction side pipe of the auxiliary compressor 10 are connected. In the case of refrigerant flow in which the outdoor heat exchanger 3 is used as a gas cooler and the indoor heat exchanger 8 is used as an evaporator, the first four-way valve 2 and the third four-way valve 9 are switched over so that the discharge side of the auxiliary compressor 10 becomes the suction side of the compressor 1. In the case of refrigerant flow in which the outdoor heat exchanger 3 is used as the evaporator and the indoor heat exchanger 8 is used as the gas cooler, the first four-way valve 2 and the third four-way valve 9 are switched over so that the discharge side of the compressor 1 becomes the suction side of the auxiliary compressor 10. By switching the second four-way valve 4, a direction of the refrigerant flowing through the expander 6 becomes always the same direction.

The operation of the heat pump type cooling and heating air conditioner of this embodiment will be explained.

First, a cooling operation mode in which the outdoor heat exchanger 3 is used as a gas cooler and the indoor heat exchanger 8 is used as an evaporator will be explained. A flow of the refrigerant in the cooling operation mode is shown with solid arrows in the drawing.

Refrigerant at the time of the cooling operation mode is compressed at a high temperature and under a high pressure by the compressor 1 which is driven by the motor 12 and is discharged. The refrigerant is introduced into the outdoor heat exchanger 3 through the first four-way valve 2. In the outdoor heat exchanger 3, since $CO_2$ refrigerant is in a supercritical state, the refrigerant is not brought into two-phase state, and dissipates heat to outside fluid such as air and water. Then, the $CO_2$ refrigerant is introduced into the sub-expander 23 and the expander 6 and is expanded by the sub-expander 23 and the expander 6. Power recover by the expander 6 at the time of expanding operation is used for driving the auxiliary compressor 10. At that time, an optimal amount of refrigerant flowing into the expander 6 is calculated from a high pressure refrigerant temperature, a high pressure refrigerant pressure and a refrigerant evaporation pressure detected on the side of the outlet of the outdoor heat exchanger 3, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. If the flow rate of refrigerant is greater than the calculated optimal refrigerant amount, torque of the electric generator 24 (load of the electric generator) is increased to reduce the flow rate of refrigerant flowing into an inlet of the expander 6.

The $CO_2$ refrigerant expanded by the sub-expander 23 and the expander 6 is introduced into the indoor heat exchanger 8 through the second four-way valve 4 and is evaporated and suctions heat in the indoor heat exchanger 8. A room is cooled by this endotherm. The refrigerant which has been evaporated is introduced into the auxiliary compressor 10 through the third four-way valve 9 and super-charged by the auxiliary compressor 10, and drawn into the compressor 1.

Next, a heating operation mode in which the outdoor heat exchanger 3 is used as the evaporator and the indoor heat exchanger 8 is used as the gas cooler will be explained. A flow of a refrigerant in this heating operation mode is shown with dashed arrows in the drawing.

Refrigerant at the time of the heating operation mode is compressed at a high temperature and under a high pressure by the compressor 1 which is driven by the motor 12 and is discharged. The refrigerant is introduced into the auxiliary compressor 10 through the first four-way valve 2 and the third four-way valve 9 and further super-pressurized by the auxiliary compressor 10. The refrigerant whose pressure was increased by the auxiliary compressor 10 is introduced into the indoor heat exchanger 8 through the third four-way valve 9. In the indoor heat exchanger 8, since $CO_2$ refrigerant is in a supercritical state, the refrigerant is not brought into two-phase state, and dissipates heat to outside fluid such as air and water. A room is heated utilizing this radiation. Then, the $CO_2$ refrigerant is introduced into the sub-expander 23 and the expander 6 and is expanded by the sub-expander 23 and the expander 6. Power recover by the expander 6 at the time of expanding operation is used for driving the auxiliary compressor 10. At that time, an optimal amount of refrigerant flowing into the expander 6 is calculated from a high pressure refrigerant temperature, a high pressure refrigerant pressure and a refrigerant evaporation pressure detected on the side of the outlet of the indoor heat exchanger 8, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. If the flow rate of refrigerant is greater than the calculated optimal refrigerant amount, torque of the electric generator 24 (load of the electric generator) is increased to reduce the flow rate of refrigerant flowing into an inlet of the expander 6.

The $CO_2$ refrigerant expanded by the sub-expander 23 and the expander 6 is introduced into the outdoor heat exchanger 3 through the second four-way valve 4 and is evaporated and suctions heat in the outdoor heat exchanger 3. The refrigerant which has been evaporated is drawn into the compressor 1 through the first four-way valve 2.

As described above, according to this embodiment, it is possible to adjust the flow rate of refrigerant of the outlet of the expander 6 by controlling the amount of refrigerant from the injection circuit 20, and it is possible to control the amount of refrigerant flowing into the expander 6 by changing the torque of the electric generator 24 (i.e., load of the electric generator) connected to the sub-expander 23 to adjust a pressure of the inlet of the expander 6. Therefore, it is possible to efficiently recover power in the expander 6, and to recover more power from the refrigeration cycle by utilizing the power recover by the sub-expander 23 for generating electricity in the electric generator 24.

Further, according to this embodiment, the compressor 1 which compresses refrigerant and the expander 6 and the auxiliary compressor 10 which recover the power are separated from each other. The refrigeration cycle is switched such that the refrigerant is supercharged by the auxiliary compressor 10 at the time of the cooling operation mode, and the refrigerant is super-pressurized at the time of the heating operation mode. With this structure, it is possible to allow the expander 6 to operate as a supercharging type expander which is suitable for cooling, and as a super-pressurizing type expander which is suitable for heating.

A refrigeration cycle apparatus according to another embodiment of the present invention will be explained with reference to the drawing based on a heat pump type cooling and heating air conditioner.

Figure 13:
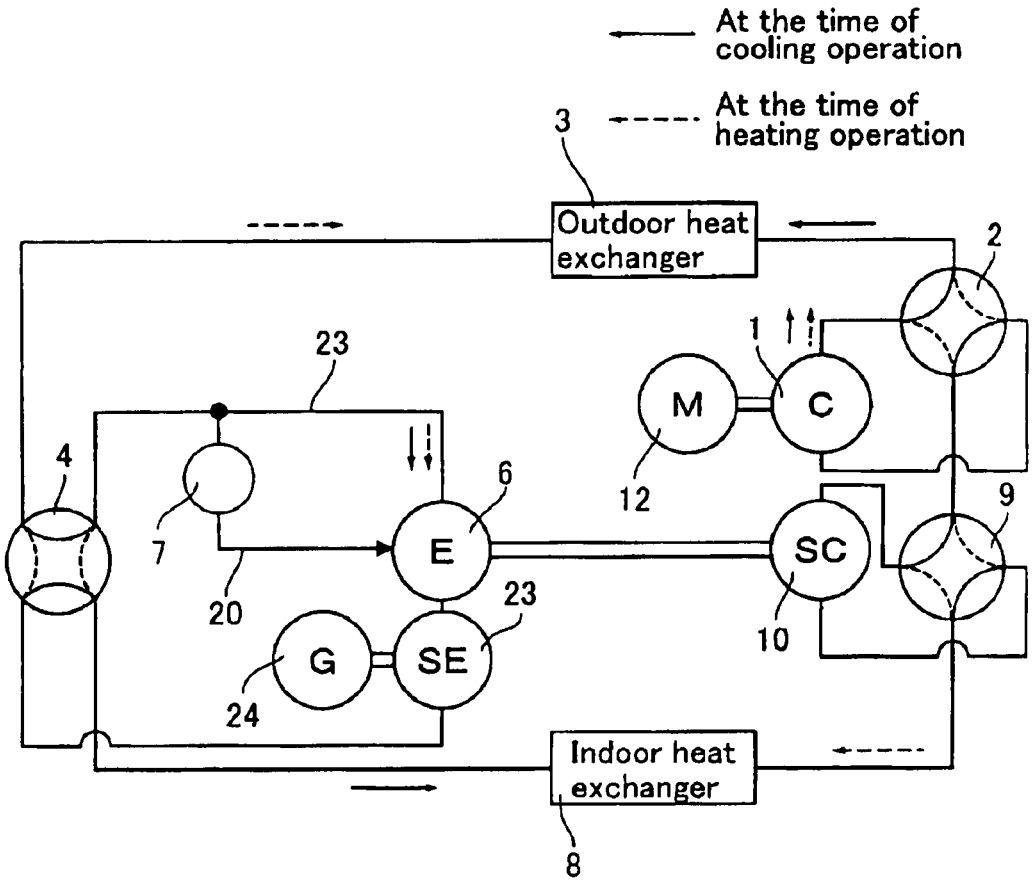
FIG. 13 shows a structure of a heat pump type cooling and heating air conditioner according to another embodiment of the invention.

FIG. 13 shows a structure of the heat pump type cooling and heating air conditioner of this embodiment.

As shown in FIG. 13, the heat pump type cooling and heating air conditioner of this embodiment uses a $CO_2$ refrigerant as refrigerant, and comprises a refrigerant circuit in which a compressor 1 having a motor 12, an outdoor heat exchanger 3, an expander 6, an indoor heat exchanger 8 and an auxiliary compressor 10 are connected to one another through pipes.

The expander 6 is provided at its discharge side with a sub-expander 23, and an electric generator 24 is connected to a drive shaft of the sub-expander 23.

The refrigerant circuit is provided with an injection circuit 20 which introduces high pressure refrigerant on the side of the outlet of the outdoor heat exchanger 3 in a halfway of the expansion process of the expander 6. The injection circuit 20 is provided with an adjusting valve 7 which adjusts an amount of refrigerant flowing through the injection circuit 20.

A drive shaft of the expander 6 and a drive shaft of the auxiliary compressor 10 are connected to each other, and the auxiliary compressor 10 is driven by power recover by the expander 6.

The refrigerant circuit comprises a first four-way valve 2 to which a discharge side pipe and a suction side pipe of the compressor 1 are connected, a second four-way valve 4 to which a discharge side pipe and a suction side pipe of the expander 6 and the injection circuit 20 are connected, and a third four-way valve 9 to which a discharge side pipe and a suction side pipe of the auxiliary compressor 10 are connected. In the case of refrigerant flow in which the outdoor heat exchanger 3 is used as a gas cooler and the indoor heat exchanger 8 is used as an evaporator, the first four-way valve 2 and the third four-way valve 9 are switched over so that the discharge side of the auxiliary compressor 10 becomes the suction side of the compressor 1. In the case of refrigerant flow in which the outdoor heat exchanger 3 is used as the evaporator and the indoor heat exchanger 8 is used as the gas cooler, the first four-way valve 2 and the third four-way valve 9 are switched over so that the discharge side of the compressor 1 becomes the suction side of the auxiliary compressor 10. By switching the second four-way valve 4, a direction of the refrigerant flowing through the expander 6 becomes always the same direction.

The operation of the heat pump type cooling and heating air conditioner of this embodiment will be explained.

First, a cooling operation mode in which the outdoor heat exchanger 3 is used as a gas cooler and the indoor heat exchanger 8 is used as an evaporator will be explained. A flow of the refrigerant in the cooling operation mode is shown with solid arrows in the drawing.

Refrigerant at the time of the cooling operation mode is compressed at a high temperature and under a high pressure by the compressor 1 which is driven by the motor 12 and is discharged. The refrigerant is introduced into the outdoor heat exchanger 3 through the first four-way valve 2. In the outdoor heat exchanger 3, since $CO_2$ refrigerant is in a supercritical state, the refrigerant is not brought into two-phase state, and dissipates heat to outside fluid such as air and water. Then, the $CO_2$ refrigerant is introduced into the expander 6 and the sub-expander 23 and is expanded by the expander 6 and the sub-expander 23. Power recover by the expander 6 at the time of expanding operation is used for driving the auxiliary compressor 10. At that time, an optimal amount of refrigerant flowing into the expander 6 is calculated from a high pressure refrigerant temperature, a high pressure refrigerant pressure and a refrigerant evaporation pressure detected on the side of the outlet of the outdoor heat exchanger 3, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. In this case, the torque of the electric generator 24 (load of the electric generator) is minimized. If the flow rate of refrigerant is greater than the calculated optimal refrigerant amount, the adjusting valve 7 is closed and torque of the electric generator 24 (load of the electric generator) is increased to reduce the flow rate of refrigerant flowing into an inlet of the expander 6.

The $CO_2$ refrigerant expanded by the sub-expander 23 and the expander 6 is introduced into the indoor heat exchanger 8 through the second four-way valve 4 and is evaporated and suctions heat in the indoor heat exchanger 8. A room is cooled by this endotherm. The refrigerant which has been evaporated is introduced into the auxiliary compressor 10 through the third four-way valve 9 and super-charged by the auxiliary compressor 10, and drawn into the compressor 1.

Next, a heating operation mode in which the outdoor heat exchanger 3 is used as the evaporator and the indoor heat exchanger 8 is used as the gas cooler will be explained. A flow of a refrigerant in this heating operation mode is shown with dashed arrows in the drawing.

Refrigerant at the time of the heating operation mode is compressed at a high temperature and under a high pressure by the compressor 1 which is driven by the motor 12 and is discharged. The refrigerant is introduced into the auxiliary compressor 10 through the first four-way valve 2 and the third four-way valve 9 and further super-pressurized by the auxiliary compressor 10. The refrigerant whose pressure was increased by the auxiliary compressor 10 is introduced into the indoor heat exchanger 8 through the third four-way valve 9. In the indoor heat exchanger 8, since $CO_2$ refrigerant is in a supercritical state, the refrigerant is not brought into two-phase state, and dissipates heat to outside fluid such as air and water. A room is heated utilizing this radiation. Then, the $CO_2$ refrigerant is introduced into the expander 6 and the sub-expander 23 and is expanded by the expander 6 and the sub-expander 23. Power recover by the expander 6 at the time of expanding operation is used for driving the auxiliary compressor 10. At that time, an optimal amount of refrigerant flowing into the expander 6 is calculated from a high pressure refrigerant temperature, a high pressure refrigerant pressure and a refrigerant evaporation pressure detected on the side of the outlet of the indoor heat exchanger 8, the number of rotation of the compressor 1 and the like. If the flow rate of the refrigerant is smaller than the calculated optimal refrigerant amount, the opening of the adjusting valve 7 is increased to increase the amount of refrigerant which is allowed to flow into the injection circuit 20, thereby increasing the amount of refrigerant per one expansion process of the expander 6. In this case, the torque of the electric generator 24 (load of the electric generator) is minimized. If the flow rate of refrigerant is greater than the calculated optimal refrigerant amount, the adjusting valve 7 is closed and torque of the electric generator 24 (load of the electric generator) is increased to reduce the flow rate of refrigerant flowing into an inlet of the expander 6.

The $CO_2$ refrigerant expanded by the sub-expander 23 and the expander 6 is introduced into the outdoor heat exchanger 3 through the second four-way valve 4 and is evaporated and suctions heat in the outdoor heat exchanger 3. The refrigerant which has been evaporated is drawn into the compressor 1 through the first four-way valve 2.

As described above, according to this embodiment, it is possible to adjust the flow rate of refrigerant of the inlet of the expander 6 by controlling the amount of refrigerant from the injection circuit 20, and it is possible to control the amount of refrigerant flowing into the expander 6 by closing the adjusting valve 7 and by changing the torque of the electric generator 24 (i.e., load of the electric generator) connected to the sub-expander 23 to adjust a pressure of the outlet of the expander 6. Therefore, it is possible to efficiently recover power in the expander 6, and to recover more power from the refrigeration cycle by utilizing the power recover by the sub-expander 21 or 23 for generating electricity in the electric generator 24.

Further, according to this embodiment, the compressor 1 which compresses refrigerant and the expander 6 and the auxiliary compressor 10 which recover the power are separated from each other. The refrigeration cycle is switched such that the refrigerant is supercharged by the auxiliary compressor 10 at the time of the cooling operation mode, and the refrigerant is super-pressurized at the time of the heating operation mode. With this structure, it is possible to allow the expander 6 to operate as a supercharging type expander which is suitable for cooling, and as a super-pressurizing type expander which is suitable for heating.

Although the above embodiments have been described using the heat pump type cooling and heating air conditioner, the present invention can also be applied to other refrigeration cycle apparatuses in which the outdoor heat exchanger 3 is used as a first heat exchanger, the indoor heat exchanger 8 is used as a second heat exchanger, and the first and second heat exchangers are utilized for hot and cool water devices or thermal storages.

As described above, according to the present invention, it is possible to adjust the flow rate of refrigerant of an outlet of the expander by controlling the amount of refrigerant from the injection circuit, and to recover power efficiently.

What is claimed is:

1. A refrigeration cycle apparatus [using] *comprising:* carbon dioxide [as] refrigerant [and having]*;* a refrigerant circuit [in which] *including* a compressor, [an outdoor heat exchanger] *a radiator*, an expander [and an indoor heat exchanger]*, an evaporator, and an injection circuit* which are all connected to one another through pipes, wherein [an injection circuit is provided in said refrigerant circuit, and] said injection circuit introduces high pressure refrigerant [on the side of] *from* an outlet of said [outdoor heat exchanger] *radiator* into a halfway of an expansion process of said expander*, and simultaneously high pressure refrigerant is introduced into an inflow of said expander, and*

*wherein the refrigerant moves from said expander into said evaporator*.

2. A refrigeration cycle apparatus according to claim 1, [further comprising] *wherein* an adjusting valve for adjusting an amount of refrigerant [from] *is provided in* said injection circuit.

3. A refrigeration cycle apparatus according to claim 1, wherein [said expander] *a pre-expansion valve* is provided [at its] *between a* refrigerant-inflow side [with a pre-expansion valve] *of said expander and said outlet of said radiator*.

4. A refrigeration cycle apparatus according to claim 1 wherein [said expander is provided at its refrigerant-inflow side with] a sub-expander *is provided between a refrigerant-inflow side of said expander and said outlet of said radiator*.

[5. A refrigeration cycle apparatus according to claim 1, wherein said expander is provided at its refrigerant-outflow side with a sub-expander.]

6. A refrigeration cycle apparatus according to claim 4 [or 5], wherein an electric generator is connected to said sub-expander.

7. A refrigeration cycle apparatus according to any one of claims 1 to [5, wherein power recover by said expander is used for driving said compressor] *4, comprising a drive shaft of the expander and a drive shaft of the compressor that are connected to each other*.

8. A refrigeration cycle apparatus according to any one of claims 1 to [5,] *4,* wherein said compressor is provided at its suction side or discharge side with an auxiliary compressor, and power recover by said expander is used as power for driving said auxiliary compressor.

9. A refrigeration cycle apparatus according to any one of claims 1 to [5,] *4,* further comprising a first four-way valve to which a discharge side pipe and a suction side pipe of said compressor are connected, and a second four-way valve to which a discharge side pipe and a suction side pipe of said expander are connected, wherein refrigerant discharged from said compressor is selectively allowed to flow into said [indoor heat exchanger] *evaporator* or said [outdoor heat exchanger] *radiator* by said first four-way valve, a direction of refrigerant flowing through said expander is always set in the same direction by said second four-way valve.

10. A refrigeration cycle apparatus according to claim 8, further comprising a first four-way valve to which discharge side pipes and suction side pipes of said compressor and said auxiliary compressor are connected, and a second four-way valve to which a discharge side pipe and a suction side pipe of said expander are connected, wherein refrigerant discharged from said compressor and said auxiliary compressor is selectively allowed to flow into said [indoor heat exchanger] *evaporator* or said [outdoor heat exchanger] *radiator* by said first four-way valve, a direction of refrigerant flowing through said expander and said sub-expander is always set in the same direction by said second four-way valve.

* * * * *